US010627121B2

(12) United States Patent
Fukui et al.

(10) Patent No.: US 10,627,121 B2
(45) Date of Patent: Apr. 21, 2020

(54) INDOOR UNIT FOR AIR-CONDITIONING APPARATUS

(71) Applicant: Mitsubishi Electric Corporation, Tokyo (JP)

(72) Inventors: Tomoya Fukui, Tokyo (JP); Hiroshi Hirosaki, Tokyo (JP); Kenichi Sakoda, Tokyo (JP); Masayuki Oishi, Tokyo (JP); Shuhei Yokota, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 398 days.

(21) Appl. No.: 15/538,367

(22) PCT Filed: Mar. 27, 2015

(86) PCT No.: PCT/JP2015/059618
§ 371 (c)(1),
(2) Date: Jun. 21, 2017

(87) PCT Pub. No.: WO2016/157297
PCT Pub. Date: Oct. 6, 2016

(65) Prior Publication Data
US 2018/0031252 A1    Feb. 1, 2018

(51) Int. Cl.
*F24F 1/0029*    (2019.01)
*F24F 13/24*    (2006.01)
(Continued)

(52) U.S. Cl.
CPC .......... *F24F 1/0029* (2013.01); *B01D 46/002* (2013.01); *B01D 46/0047* (2013.01);
(Continued)

(58) Field of Classification Search
CPC ............ B01D 46/4236; B01D 46/0047; B01D 46/002; B01D 2279/50; F04D 29/703;
(Continued)

(56) References Cited

U.S. PATENT DOCUMENTS 6,503,060 B1 * 1/2003 Kamada ................ F04D 29/703
 415/121.2
7,118,333 B2 * 10/2006 Takemoto ............. F04D 29/703
 415/211.2
(Continued)

FOREIGN PATENT DOCUMENTS

CN    1319165 A    10/2001
CN    1497227 A    5/2004
(Continued)

OTHER PUBLICATIONS

Chinese Office Action dated Apr. 12, 2019 issued in corresponding Chinese Patent Application No. 201580047867.5 (and English translation).
(Continued)

*Primary Examiner* — Minh Chau T Pham
(74) *Attorney, Agent, or Firm* — Posz Law Group, PLC

(57) ABSTRACT

An indoor unit includes axial-flow fans, which are provided on downstream of an air inlet. Further, a plurality of first bars are provided to the air inlet. In plan view, leading edge portions of blades of the axial-flow fan are inclined in a direction of rotation of the axial-flow fan from a rotary shaft side of the axial-flow fan to an outer peripheral side. Further, in plan view, the plurality of first bars are inclined in a direction opposite to the direction of rotation of the axial-flow fan from the rotary shaft side of the axial-flow fan to the outer peripheral side.

8 Claims, 30 Drawing Sheets

(51) Int. Cl.
- *F24F 13/28* (2006.01)
- *F24F 1/0033* (2019.01)
- *F04D 29/70* (2006.01)
- *B01D 46/00* (2006.01)
- *B01D 46/42* (2006.01)

(52) U.S. Cl.
CPC ....... *B01D 46/4236* (2013.01); *F04D 29/703* (2013.01); *F24F 13/24* (2013.01); *F24F 13/28* (2013.01); *B01D 2279/50* (2013.01); *F24F 1/0033* (2013.01)

(58) Field of Classification Search
CPC .......... F24F 1/0029; F24F 13/24; F24F 13/28; F24F 1/0033
USPC ..... 55/471–473, 385.1; 415/193, 191, 209.1, 415/211.2, 121.2, 208.2; 416/241 R
See application file for complete search history.

(56) References Cited

U.S. PATENT DOCUMENTS

| | | | | |
|---|---|---|---|---|
| 2002/0159883 | A1* | 10/2002 | Simon | F04D 29/703 415/193 |
| 2003/0026691 | A1* | 2/2003 | Huang | F04D 29/542 415/121.2 |
| 2005/0238481 | A1* | 10/2005 | Yamamoto | F04D 29/703 415/121.2 |
| 2012/0018117 | A1 | 1/2012 | Yamada et al. | |
| 2013/0105125 | A1 | 5/2013 | Oishi et al. | |
| 2014/0209275 | A1* | 7/2014 | Schone | F04D 29/541 165/96 |
| 2016/0084520 | A1* | 3/2016 | Fukui | F24F 13/22 62/291 |
| 2016/0097547 | A1* | 4/2016 | Selg | F24F 13/20 62/293 |
| 2016/0146217 | A1* | 5/2016 | Tadokoro | F04D 19/002 415/121.2 |
| 2016/0223211 | A1* | 8/2016 | Xue | F24F 1/0022 |
| 2018/0202465 | A1* | 7/2018 | Randall | E06B 7/02 |

FOREIGN PATENT DOCUMENTS

| | | | |
|---|---|---|---|
| CN | 1692256 A | 11/2005 | |
| CN | 103075791 A | 5/2013 | |
| EP | 1 467 156 A1 | 10/2004 | |
| EP | 1 600 640 A2 | 11/2005 | |
| EP | 2 597 393 A2 | 5/2013 | |
| GB | 2324572 A * | 10/1998 | ............ F04D 29/66 |
| JP | S62-169298 U | 10/1987 | |
| JP | 2001-235213 A | 8/2001 | |
| JP | 2004-138261 A | 5/2004 | |
| JP | 2004-156884 A | 6/2004 | |
| JP | 2007-139214 A | 6/2007 | |
| JP | 2013-92313 A | 5/2013 | |
| JP | 2013-242064 A | 12/2013 | |
| WO | 01/11241 A1 | 2/2001 | |
| WO | 2010/089920 A1 | 8/2010 | |

OTHER PUBLICATIONS

International Search Report of the International Searching Authority dated Jun. 30, 2015 for the corresponding international application No. PCT/JP2015/059618 (and English translation).

Office Action dated Nov. 28, 2018 issued in corresponding Chinese Patent Application No. 201580047867.5 (and English translation).

Office Action dated Sep. 11, 2019 issued in corresponding EP patent application No. 15 887 452.9.

Extended European Search Report dated Nov. 2, 2018 in corresponding European Patent Application No. 15887452.9.

* cited by examiner

A-A

INDOOR UNIT FOR AIR-CONDITIONING APPARATUS

This application is a U.S. national stage application of PCT/JP2015/059618 filed on Mar. 27, 2015, the contents of which are incorporated herein by reference.

TECHNICAL FIELD

The present invention relates to an indoor unit for an air-conditioning apparatus, and more particularly, to an indoor unit for an air-conditioning apparatus, which suppresses noise generated in a fan.

BACKGROUND ART

Hitherto, there has been proposed an indoor unit for an air-conditioning apparatus, in which an axial-flow fan is adopted as a fan for the indoor unit (see, for example, Patent Literature 1). The indoor unit for an air-conditioning apparatus described in Patent Literature 1 includes a casing having an air inlet formed in an upper surface of the casing and an air outlet formed in a lower portion of a front surface, an axial-flow fan provided on downstream of the air inlet, a heat exchanger provided at a position on downstream of the axial-flow fan and on upstream of the air outlet, and a plurality of filters provided to the air inlet to remove dust from air sucked into the casing by operating the axial-flow fan.

CITATION LIST

Patent Literature

Patent Literature 1: International Patent WO 2010/089920 A

SUMMARY OF INVENTION

Technical Problem

In the indoor unit for an air-conditioning apparatus, bars need to be provided to the air inlet so as to ensure strength of the casing, that is, the indoor unit. Therefore, in a case of the indoor unit for an air-conditioning apparatus in which the axial-flow fan is adopted as a fan for the indoor unit, the bars serving as ventilation resistance are provided to a windward side of the axial-flow fan. In this case, a speed loss area, (area in which a flow rate is low) is generated in a slipstream behind the bars (airstream on downstream). Thus, when leading edge portions of the blades of the axial-flow fan interfere with the slipstream behind the bars, a sudden pressure fluctuation occurs. Therefore, there is a problem in that the noise generates.

The present invention has been made to solve the problem described above, and has an object to provide an indoor unit for an air-conditioning apparatus, in which strength of a casing is ensured and noise generated in an axial-flow fan is suppressed.

Solution to Problem

According to one embodiment of the present invention, there is provided an indoor unit for an air-conditioning apparatus, including: a casing having an air inlet formed in an upper surface of the casing and an air outlet formed below the air inlet; an axial-flow fan, which is provided on downstream of the air inlet and includes a plurality of blades; a heat exchanger, which is provided at a position on downstream of the axial-flow fan and on upstream of the air outlet; a plurality of filters, which is provided to the air inlet to remove dust from air sucked into the casing by operating the axial-flow fan; and a bar, which is provided on at least one of upstream of the plurality of filters and downstream of the plurality of filters in the air inlet, in which: the bar includes a plurality of first bars, which radially extend from a rotary shaft of the axial-flow fan in plan view; leading edge portions of the plurality of blades are inclined in a direction of rotation of the axial-flow fan from the rotary shaft side of the axial-flow fan to an outer peripheral side in plan view; and the plurality of first bars are inclined in a direction opposite to the direction of rotation of the axial-flow fan from the rotary shaft side of the axial-flow fan to the outer peripheral side in plan view.

Advantageous Effects of Invention

In the indoor unit for an air-conditioning apparatus according to one embodiment of the present invention, the leading edge portions of the blades of the axial-flow fan gradually interfere with the slipstream behind the bars so that a range of interference between the leading edge portions of the blades of the axial-flow fan and the slipstream behind the bars can be reduced. Therefore, in the indoor unit for an air-conditioning apparatus according to one embodiment of the present invention, the strength of the casing can be ensured, and the noise generated i the axial-flow fan can also be suppressed.

BRIEF DESCRIPTION OF DRAWINGS

FIG. 7 are views for illustrating a filter of the indoor unit for an air-conditioning apparatus according to Embodiment 1 of the present invention, in which FIG. 7(A) is a plan view of the filter and FIG. 7(B) is a side view of the filter.

DESCRIPTION OF EMBODIMENTS

Embodiment 1

Figure 1:
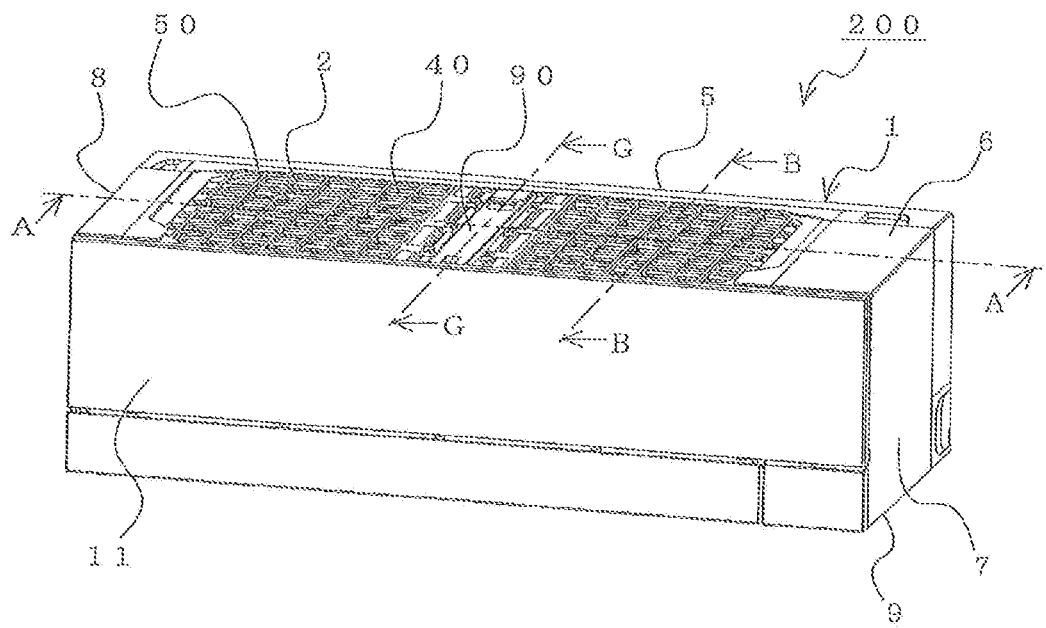
FIG. 1 is a perspective view of an indoor unit for an air-conditioning apparatus according to Embodiment 1 of the present invention.
Figure 2:
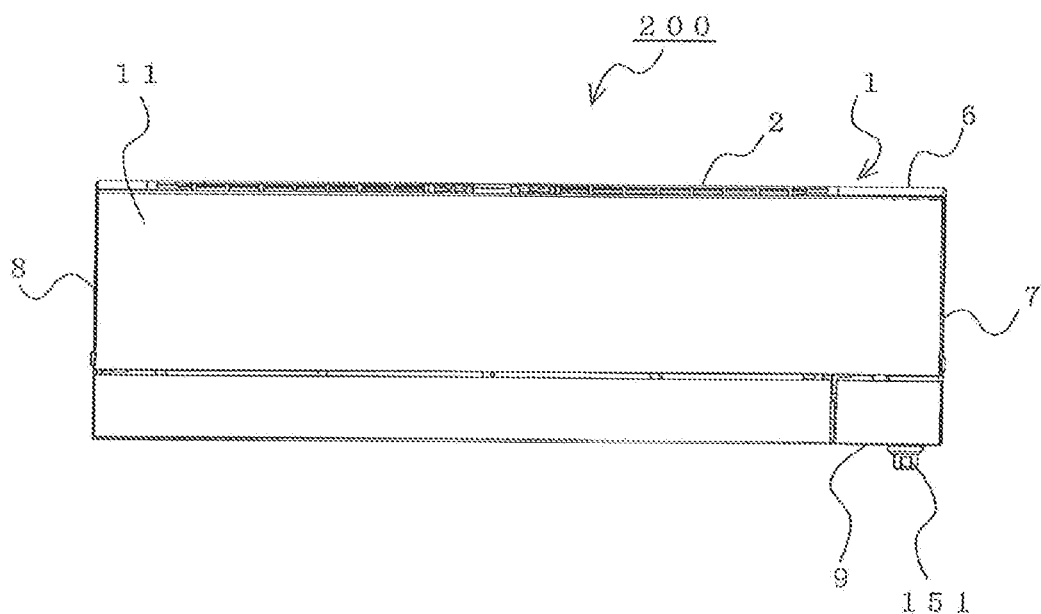
FIG. 2 is a front view of the indoor unit for an air-conditioning apparatus according to Embodiment 1 of the present invention.
Figure 3:
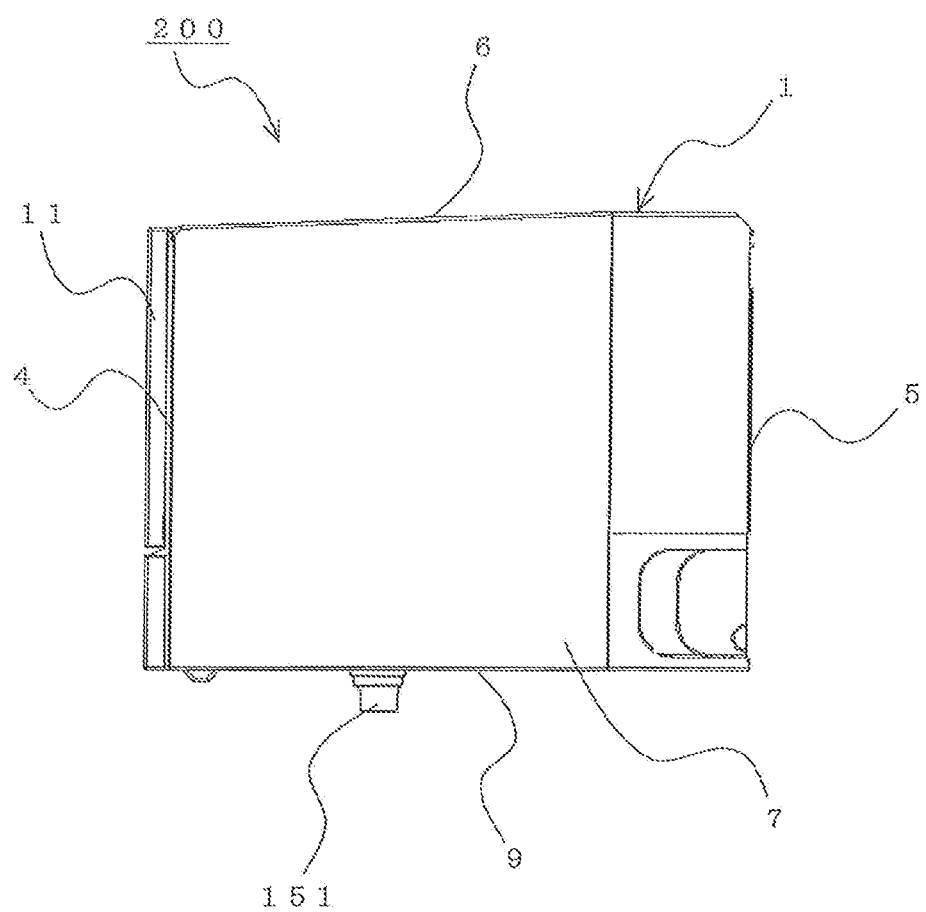
FIG. 3 is a right side view of the indoor unit for an air-conditioning apparatus according to Embodiment 1 of the present invention.
Figure 4:
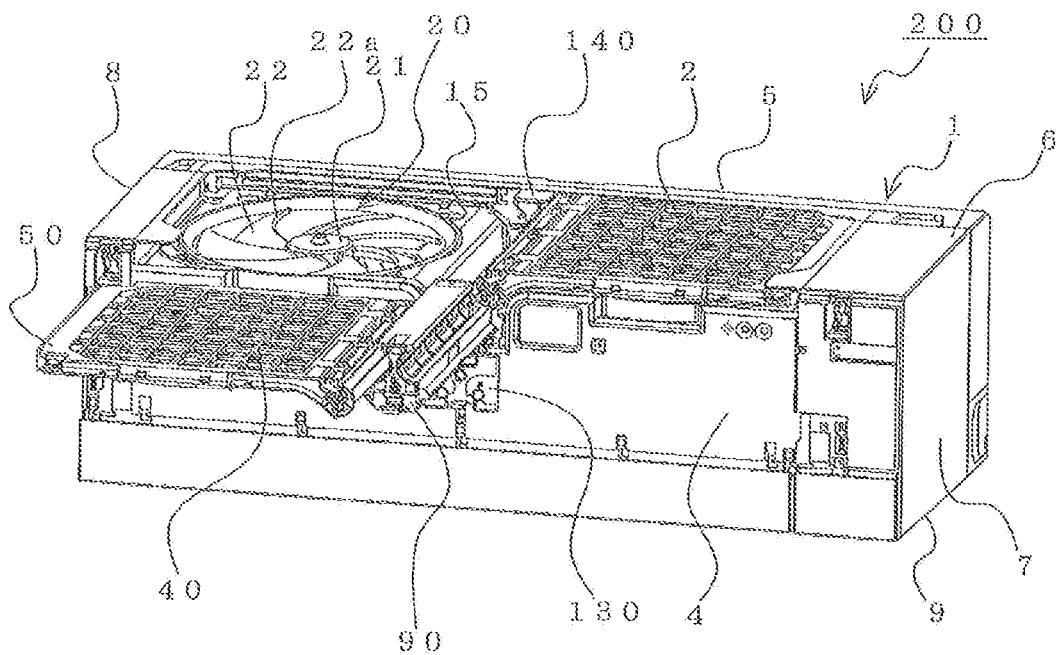
FIG. 4 is a perspective view for illustrating the indoor unit for an air-conditioning apparatus according to Embodiment 1 of the present invention in a state in which a decorative panel is dismounted.
Figure 5:
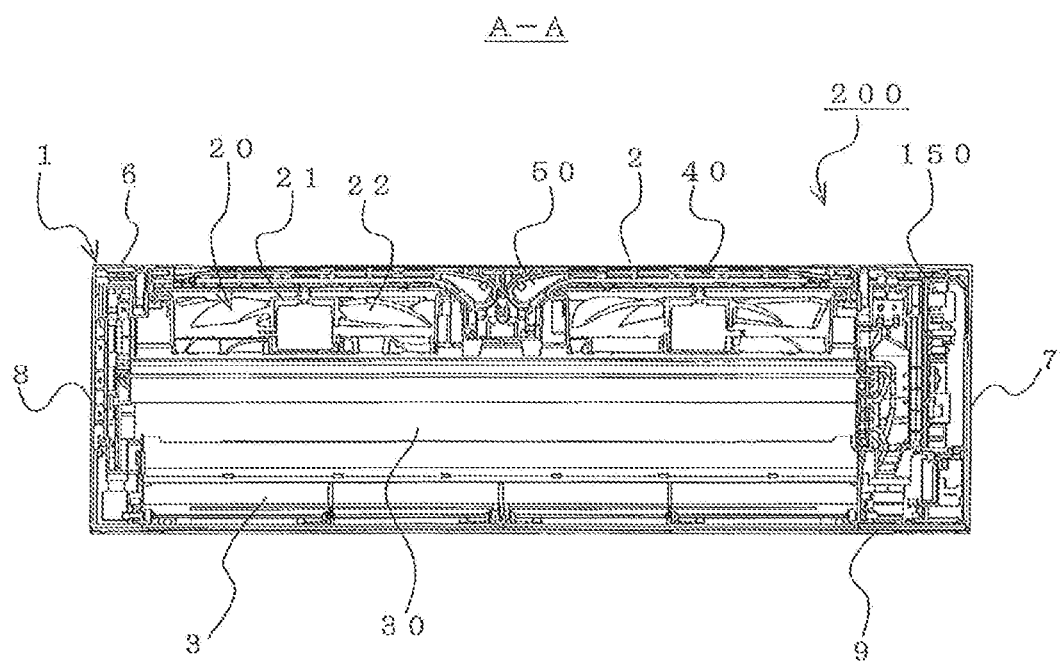
FIG. 5 is a sectional view of FIG. 1, taken along the line A-A.
Figure 6:
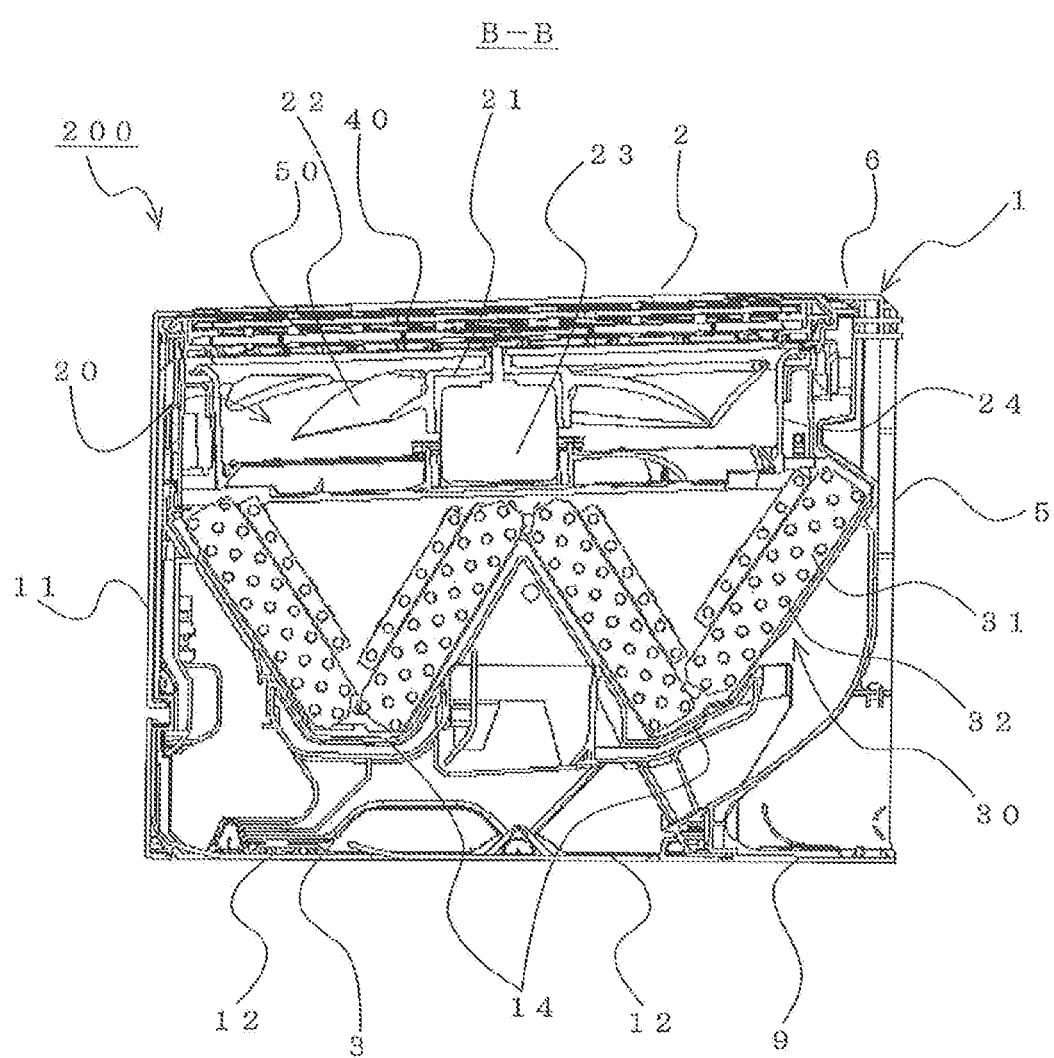
FIG. 6 is a sectional view of FIG. 1, taken along the line B-B.

FIG. 1 is a perspective view of an indoor unit for an air-conditioning apparatus according to Embodiment 1 of the present invention. FIG. 2 is a front view of the indoor unit. FIG. 3 is a right side view of the indoor unit. FIG. 4 is a perspective view for illustrating the indoor unit in a state in which a decorative panel is dismounted. FIG. 5 is a sectional view of FIG. 1, taken along the line A-A. FIG. 6 is a sectional view of FIG. 1, taken along the line B-B.

Now, the overall structure of an indoor unit 200 for an air-conditioning apparatus according to Embodiment 1 is described referring to FIG. 1 to FIG. 6.

The indoor unit 200 is configured to supply conditioned air into an air-conditioned space such as a room through use of a refrigeration cycle configured to circulate refrigerant. The indoor unit 200 mainly includes a casing 1 having an air inlet 2 configured to suck indoor air inside and an air outlet 3 configured to supply the conditioned air to an air-conditioned area, fans housed inside the casing 1 and configured to suck the indoor air from the air inlet 2 so as to blow the conditioned air from the air outlet 3, and a heat exchanger 30 configured to generate the conditioned air through heat exchange between the refrigerant and the indoor air.

The casing 1 has the air inlet 2 formed in an upper surface 6 of the casing 1 and the air outlet 3 formed below the air inlet 2. In Embodiment 1, the air outlet 3 is formed in a lower part of a front surface 4 of the casing 1 and in a lower surface 9 of the casing 1. Vertical airflow-direction flaps 12 configured to adjust a vertical airflow direction of the conditioned air blown from the air outlet and right-and-left airflow-direction flaps (not shown) configured to adjust a right-and-left airflow direction of the conditioned air blown from the air outlet are provided to the air outlet 3. Further, the vertical airflow-direction flaps 12 are configured to close the air outlet 3 while the indoor unit 200 is in a stopped state.

The fans and the heat exchanger 30 are provided inside the casing 1 so as to be located on a downstream side of the air inlet 2 and on an upstream side of the air outlet 3. In Embodiment 1, axial-flow fans 20, which are, for example, propeller fans, are used as the fans. Each of the axial-flow fans 20 includes a boss portion 21 serving as a rotary shaft and a plurality of blades 22 provided on an outer peripheral side of the boss portion 21. The axial-flow fan 20 is driven by a fan drive motor 23 coupled to the boss portion 21. Further, a duct-shaped bellmouth 24 having an upstream-side end portion with an enlarged diameter is provided on an outer peripheral side of the axial-flow fan 20.

In general, a space for installation of the indoor unit for an air-conditioning apparatus is restricted. For this reason, the axial-flow fans 20 cannot be increased in size in many cases. Therefore, in order to obtain a desired airflow rate, the plurality of (two in Embodiment 1) axial-flow fans 20 are arranged side by side in a longitudinal direction (right-and-left direction) of the casing 1 in Embodiment 1.

The axial-flow fans 20 are not limited to the plurality of axial-flow fans 20. Only a single axial-flow fan 20 may be provided in the indoor unit 200 as long as the desired airflow rate can be obtained. Further, as the fans to be used for the indoor unit 200, crossflow fans may be adopted. In Embodiment 1, a mixed-flow fan is included in the axial-flow fans. This is because an overall air flow from the mixed-flow fan is also along a rotary shaft of the fan.

The heat exchanger 30 is provided so as to be located on a downstream side of the axial-flow fans 20 and on the upstream side of the air outlet 3. The heat exchanger 30 includes a plurality of fins 31 arranged side by side at predetermined intervals therebetween and a plurality of heat-transfer tubes 32 passing through the fins 31 in a direction in which the fins 31 are arranged side by side, inside which the refrigerant flows. In Embodiment 1, the heat exchanger 30 is formed to have an approximately W-like shape in side view. During a cooling operation, when indoor air is cooled by the heat exchanger 30, condensation may occur in the heat exchanger 30. Therefore, the indoor unit 200 according to Embodiment 1 includes drain pans 14 provided below the heat exchanger 30, which are configured to collect the condensation. When the crossflow fans are adopted for the indoor unit 200, the heat exchanger 30 may be arranged on an upstream side of the crossflow fans.

The indoor unit 200 according to Embodiment 1 includes filters 40 configured to remove the dust from the air sucked into the casing 1 by the axial-flow fans 20, a cleaning mechanism 110 configured to clean the filters 40, and a dust box 90 including a dust collecting portion 91 configured to collect the dust removed by the cleaning mechanism 110. The filters 40 are provided to the air inlet 2 of the casing 1 so as to be freely mountable and dismountable. In Embodiment 1, the filters 40 are respectively accommodated in cartridges 50 so as to be freely movable. The cartridges 50 are provided to the air inlet 2 of the casing 1 so as to be freely mountable and dismountable in the fore-and-aft direction. The cleaning mechanism 110 and the dust box 90 are provided on the upstream side of the axial-flow fans 20 inside the casing 1. In Embodiment 1, the dust box 90 includes the cleaning mechanism 110. The dust box 90 is provided in the casing 1 so as to be freely mountable and dismountable in the fore-and-aft direction.

In the indoor unit 200 according to Embodiment 1, a design panel 11 is provided in front of the front surface 4 of the casing 1 so as to be freely openable and closable. By closing the design panel 11, front sides of the cartridges 50 and a front side of the dust box 90 are covered. In this manner, design properties of the indoor unit 200 can be improved.

Details of the filters 40, the cartridges 50, the cleaning mechanism 110, the dust box 90, and other components are described later.

The indoor unit 200 according to Embodiment 1 also includes an infrared sensor 151 and a controller 150. The infrared sensor 151 is configured to detect an indoor temperature distribution, a position of a user in a room, and other conditions. The controller 150 is configured to control an angle of the vertical airflow-direction flaps 12, an angle of the right-and-left airflow-direction flaps (not shown), a rotation speed of the axial-flow fans 20 (more specifically, a rotation speed of the fan drive motors 23), and other conditions based on operation information input to a remote controller (not shown), detection information of the infrared sensor 151, and other information. The controller 150 includes, for example, a microcomputer.

The indoor unit 200 configured as described above is provided on, for example, an indoor wall surface. The indoor unit 200 rotationally drives the axial-flow fans 20 (more specifically, the fan drive motors 23) to cause the indoor air to pass through the filters 40 to remove the dust in the air so that the indoor air is sucked into a ventilation passage inside the casing 1. The indoor air exchanges heat with the refrigerant that circulates inside the heat-transfer tubes 32 in the heat exchanger 30 to turn into conditioned air. After the conditioned air is controlled to flow in a desired airflow direction by the vertical airflow-direction flaps 12 and the right-and-left airflow-direction flaps (not shown), the conditioned air is supplied from the air outlet 3 into an air-conditioned space.

[Detailed Configurations]

Next, detailed configurations of the filters 40, the cartridges 50, the dust box 90, the cleaning mechanism 110, and other components are described.

(Filter 40)

Figure 7:
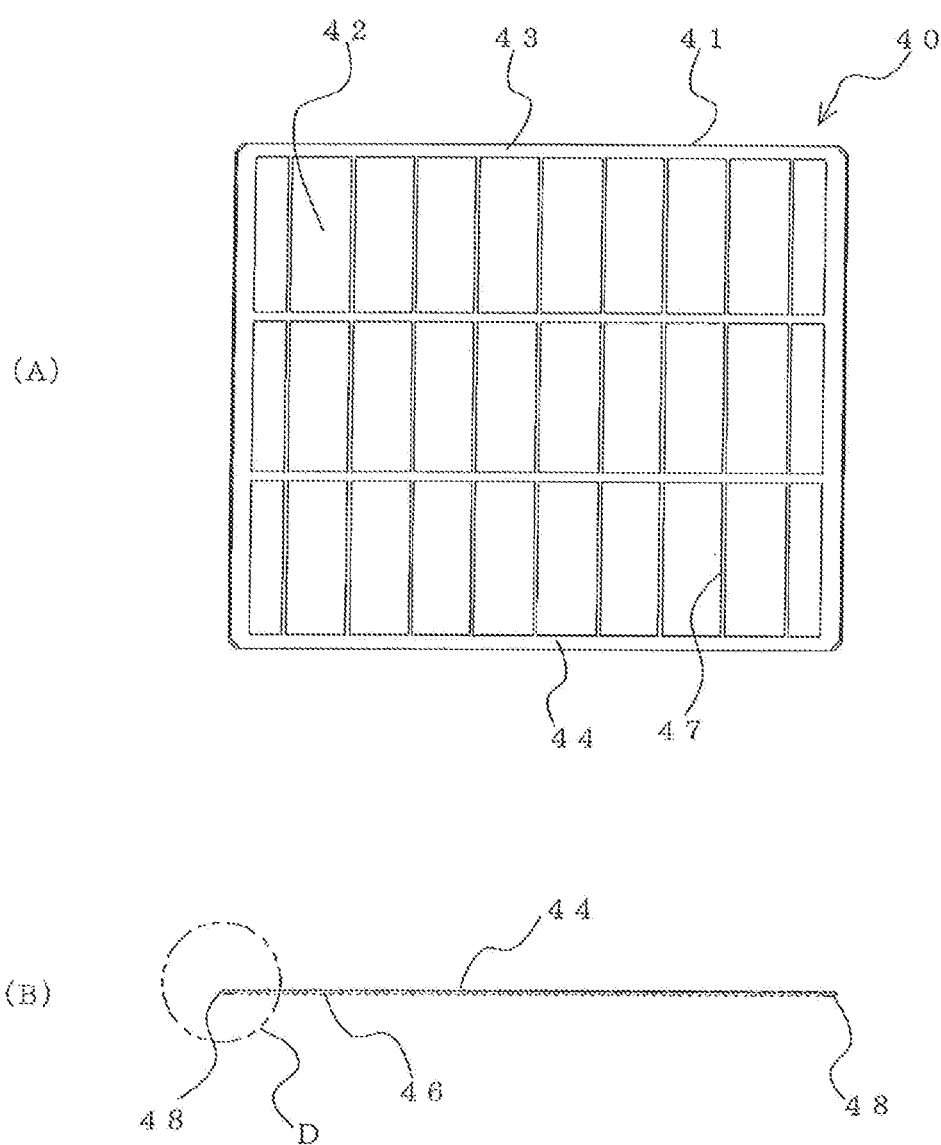

FIG. 7 are views for illustrating the filter of the indoor unit for an air-conditioning apparatus according to Embodiment 1 of the present invention, in which FIG. 7(A) is a plan view of the filter and FIG. 7(B) is a side view of the filter.

The filter 40 according to Embodiment 1 is formed into a plate-like shape, and includes an outer frame 41, trapping portions 42, and a grid 47. The outer frame 41 forms an outer peripheral portion of the filter 40 and is formed into a picture frame-like shape. On an inner peripheral side of the outer frame 41, the trapping portions 42, each formed of a mesh-like member and configured to trap the dust in the indoor air, are provided. Further, on the inner peripheral side of the outer frame 41, the grid 47 configured to suppress deformation of the outer frame 41 is provided. The filter 40 is accommodated in the cartridge 50 so as to be freely movable in the right-and-left direction.

(Cartridge 50)

Figure 8:
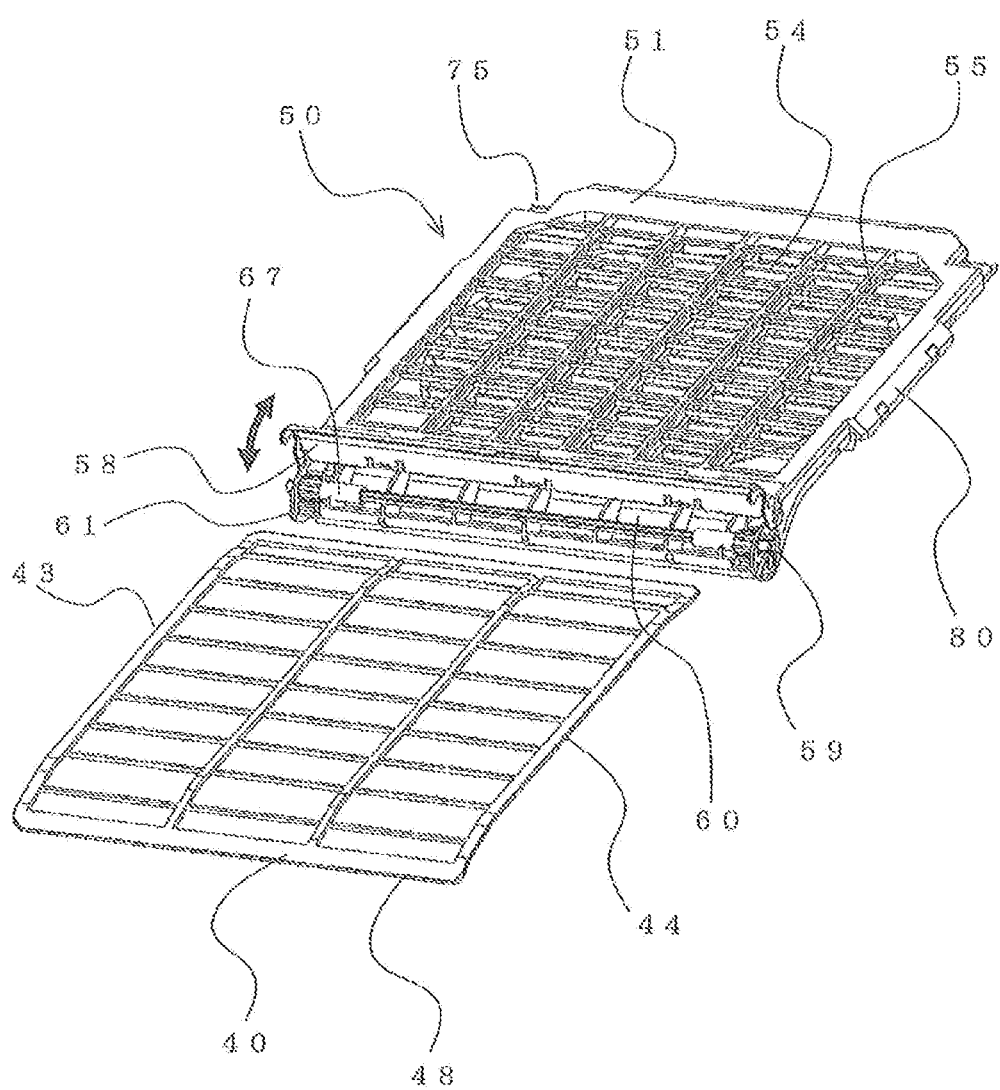
FIG. 8 is an assembly perspective view for illustrating a cartridge of the indoor unit for an air-conditioning apparatus according to Embodiment 1 of the present invention.
Figure 9:
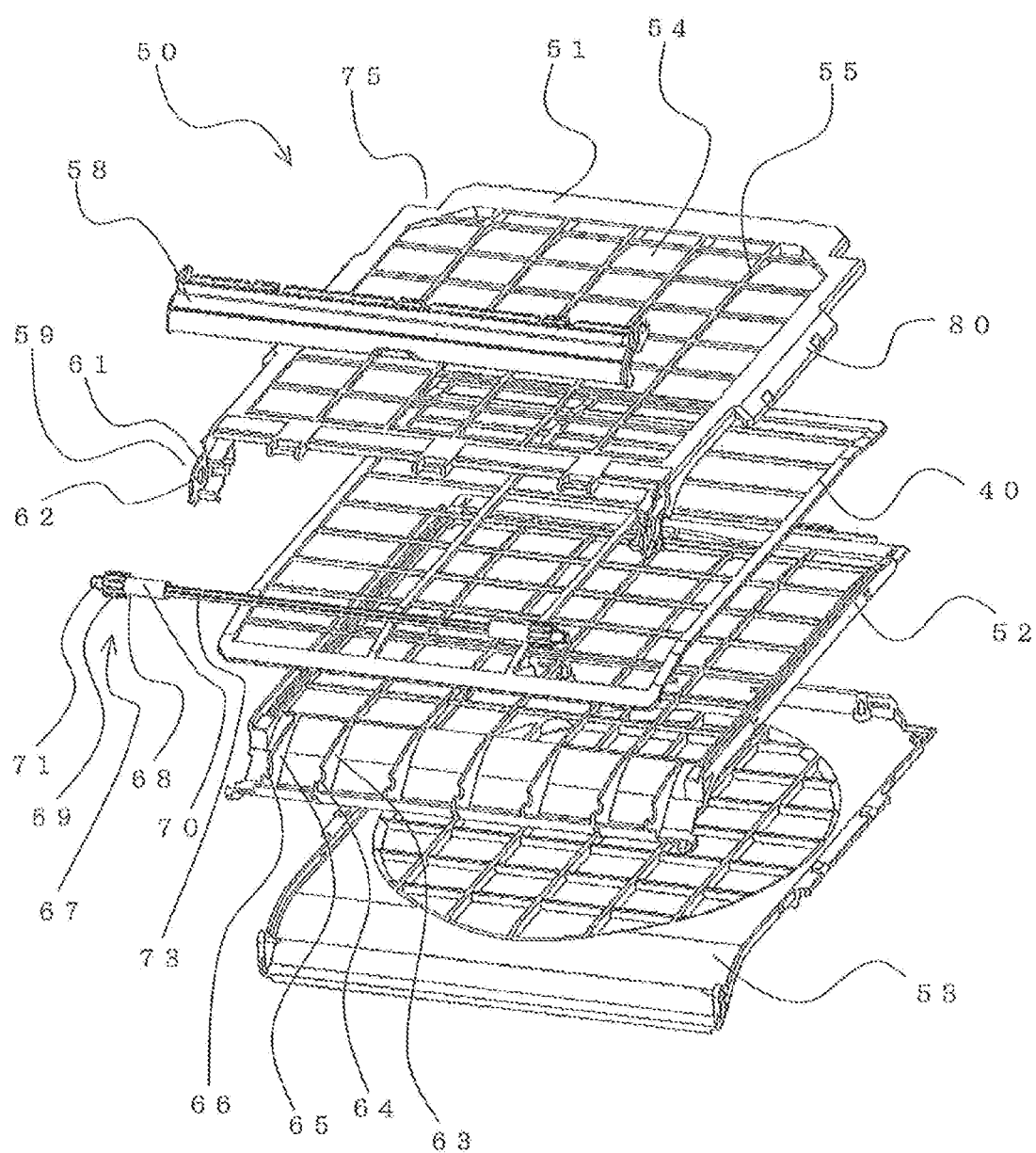
FIG. 9 is an exploded perspective view for illustrating the cartridge of the indoor unit for an air-conditioning apparatus according to Embodiment 1 of the present invention.
Figure 10:
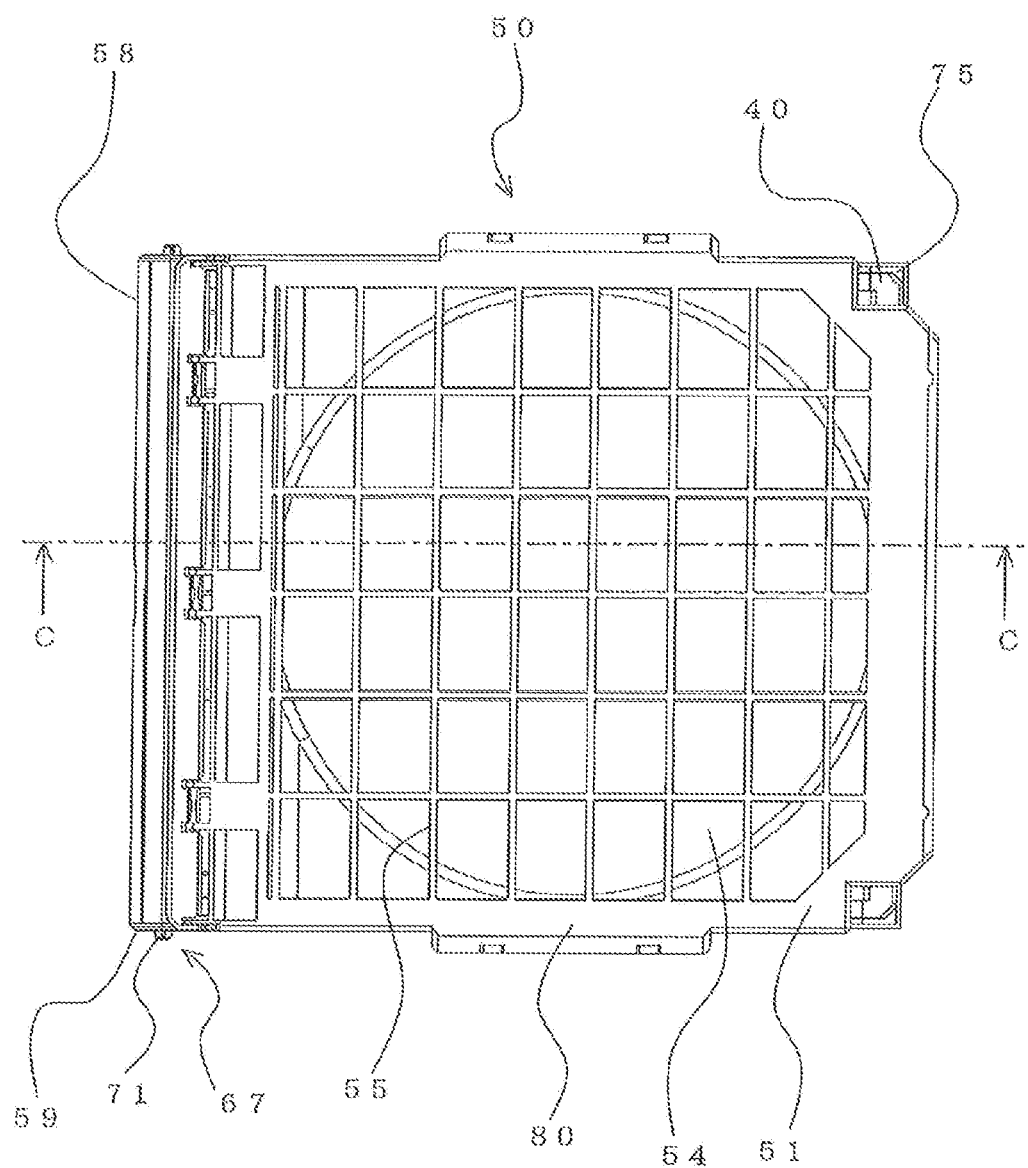
FIG. 10 is a plan view for illustrating the cartridge of the indoor unit for an air-conditioning apparatus according to Embodiment 1 of the present invention.
Figure 11:
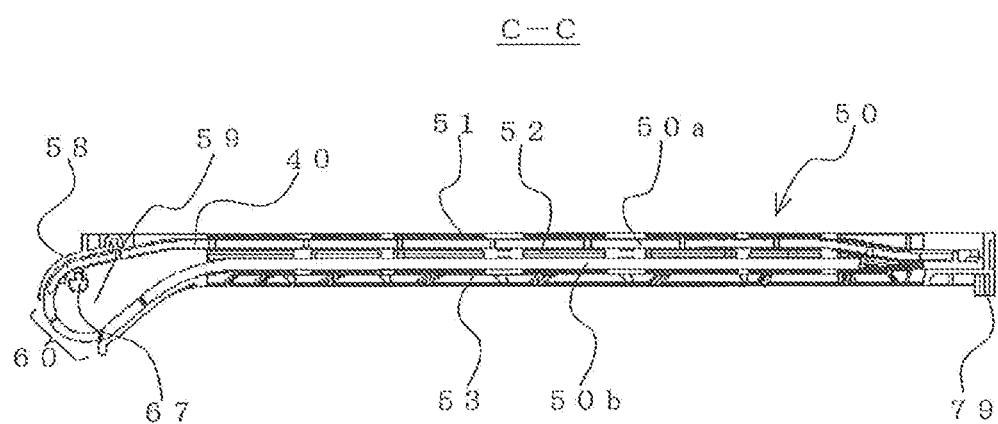
FIG. 11 is a sectional view of FIG. 10, taken along the line C-C.

FIG. 8 is an assembly perspective view for illustrating the cartridge of the indoor unit for an air-conditioning apparatus according to Embodiment 1 of the present invention. FIG. 9 is an exploded perspective view for illustrating the cartridge. FIG. 10 is a plan view for illustrating the cartridge. FIG. 11 is a sectional view of FIG. 10, taken along the line C-C.

The cartridge 50 has an approximately rectangular parallelepiped shape, and is provided to the air inlet 2 of the casing 1 so as to be freely mountable and dismountable in the fore-and-aft direction (see FIG. 4). The cartridge 50 includes a first frame 51 that forms an upper surface, a third frame 53 that forms a lower surface, and a second frame 52 provided between the first frame 51 and the third frame 53. Further, ventilation ports 54 are formed in the first frame 51, the second frame 52, and the third frame 53 at positions opposed to the axial-flow fan 20. Further, bars 55 configured to ensure strength of the cartridge 50 are provided to the ventilation ports 54 formed in the first frame 51, the second frame 52, and the third frame 53.

In this case, the casing 1 is formed with the air inlet 2 having a large opening. Therefore, in order to ensure the strength of the casing 1, strength in the vicinity of the air inlet 2 is required to be ensured. In the indoor unit 200 according to Embodiment 1, the strength in the vicinity of the air inlet 2 (specifically, the strength of the casing 1) is ensured by the cartridge 50 whose strength is ensured by the bars 55.

Further, a handle 80 is provided to the cartridge 50 (for example, the first frame 51) at a position on a front surface (on a lower side in FIG. 10, for example) in a state in which the cartridge 50 is mounted into the casing 1. By providing the handle 80 to the cartridge 50, the dismount of the cartridge 50 from the casing 1 is facilitated. In Embodiment 1, the cartridge 50 is formed into a longitudinally symmetrical shape so as not to limit a direction in which the cartridge 50 is mounted into and dismounted from the casing 1, specifically, so that the cartridge 50 can be mounted into the casing 1 both from a lower side and an upper side illustrated in FIG. 10. In other words, the cartridge 50 is formed to have a symmetrical shape across the line C-C illustrated in FIG. 10. Therefore, for the cartridge 50 according to Embodiment 1, the handles 80 are provided both at a position on the front surface and at a position on a rear surface in the state in which the cartridge 50 is mounted into the casing 1.

With the configuration of the cartridge 50 as described above, a space serving as an upper traveling path 50a for the filter 40 is formed between the first frame 51 and the second frame 52 that are stacked on each other. Further, a space serving as a lower traveling path 50b for the filter 40 is formed between the second frame 52 and the third frame 53.

In this case, the first frame 51 corresponds to an upper frame of the present invention, the second frame 52 corresponds to an intermediate frame of the present invention, and the third frame 53 corresponds to a lower frame of the present invention.

In the indoor unit 200 according to Embodiment 1, the filter 40 is configured to be positioned in the upper traveling path 50a of the cartridge 50 during an operating state (cooling operation state and heating operation state). Further, during the cleaning of the filter 40, the filter 40 is configured to be moved into the lower traveling path 50b of the cartridge 50. Thus, the cartridge 50 has an opening port 60 formed in one end portion in a right-and-left direction. More specifically, the cartridge 50 has the opening port 60 formed in one of the end portions in the right-and-left direction, which is located on a side opposed to the dust box 90 including the cleaning mechanism 110. The cleaning mechanism 110 is configured to clean the filter 40 through the opening port 60. The movement of the filter 40 between the upper traveling path 50a and the lower traveling path 50b can be realized, for example, by the following drive mechanism.

Figure 12:
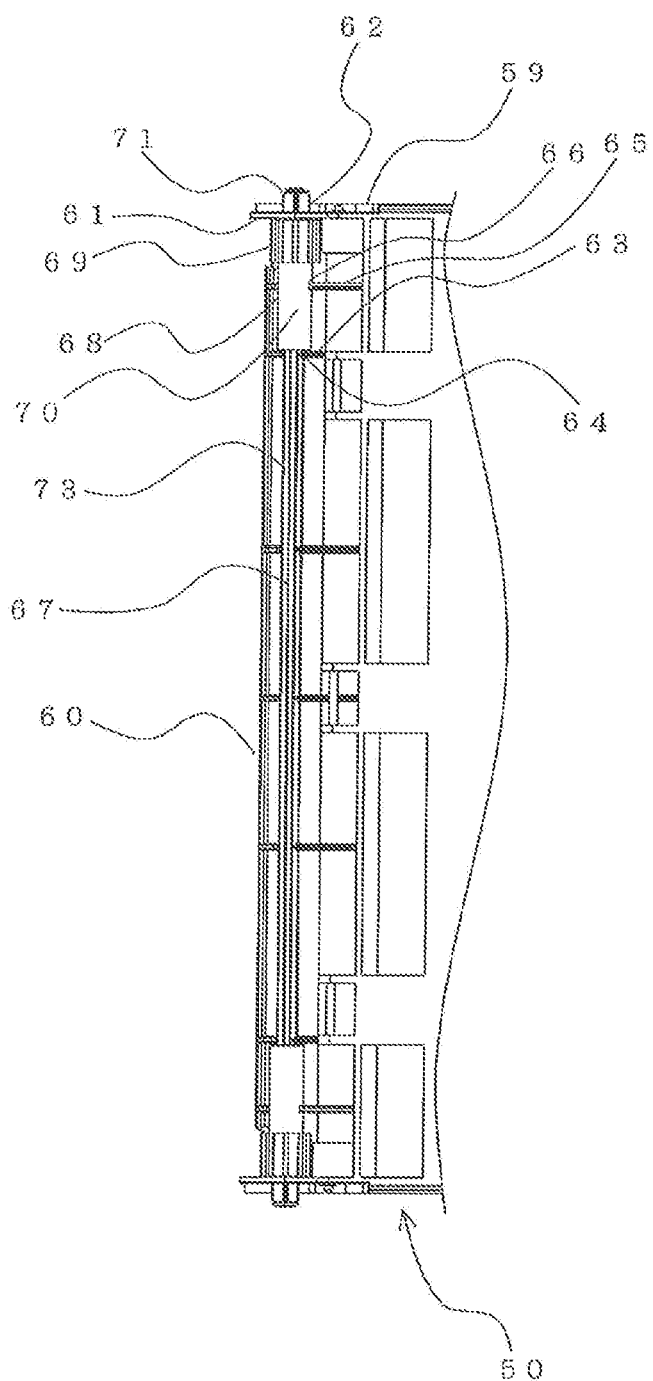
FIG. 12 is a plan view for illustrating the vicinity of an end portion of the cartridge on a dust box side in the indoor unit for an air-conditioning apparatus according to Embodiment 1 of the present invention.
Figure 13:
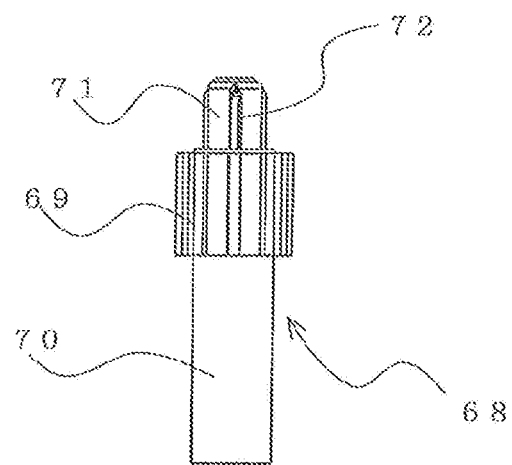
FIG. 13 is a plan view for illustrating a filter moving gear body of a filter drive shaft illustrated in FIG. 12.
Figure 14:
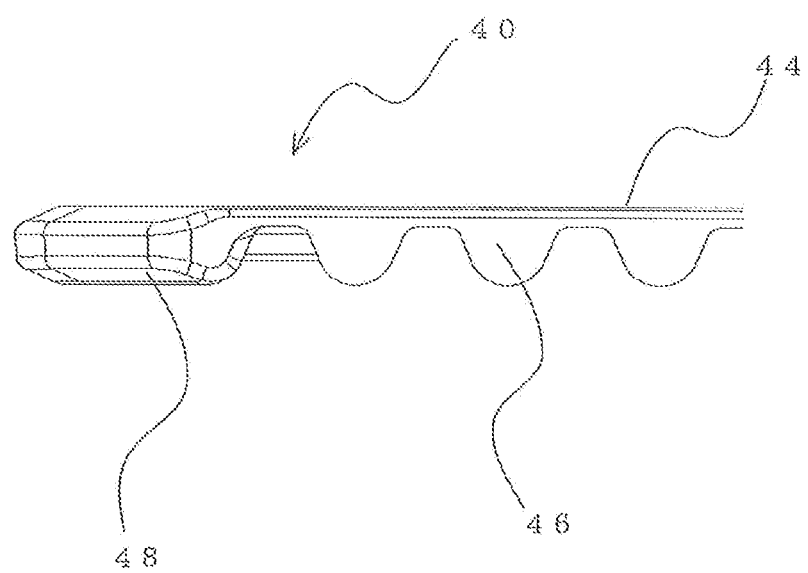
FIG. 14 is a main part enlarged view of a portion D illustrated in FIG. 7(B) in an enlarged manner.
Figure 15:
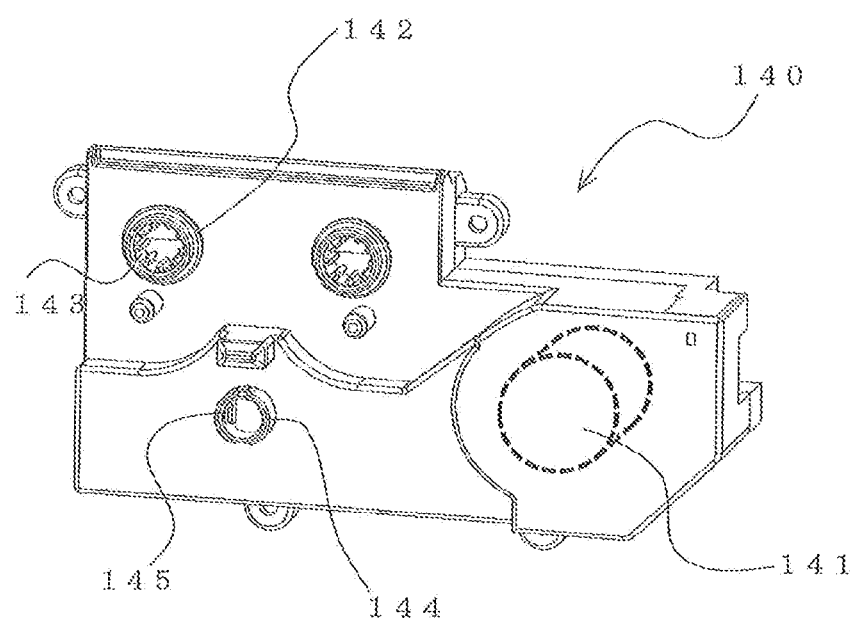
FIG. 15 is a perspective view for illustrating a motor unit of the indoor unit for an air-conditioning apparatus according to Embodiment 1 of the present invention.
Figure 16:
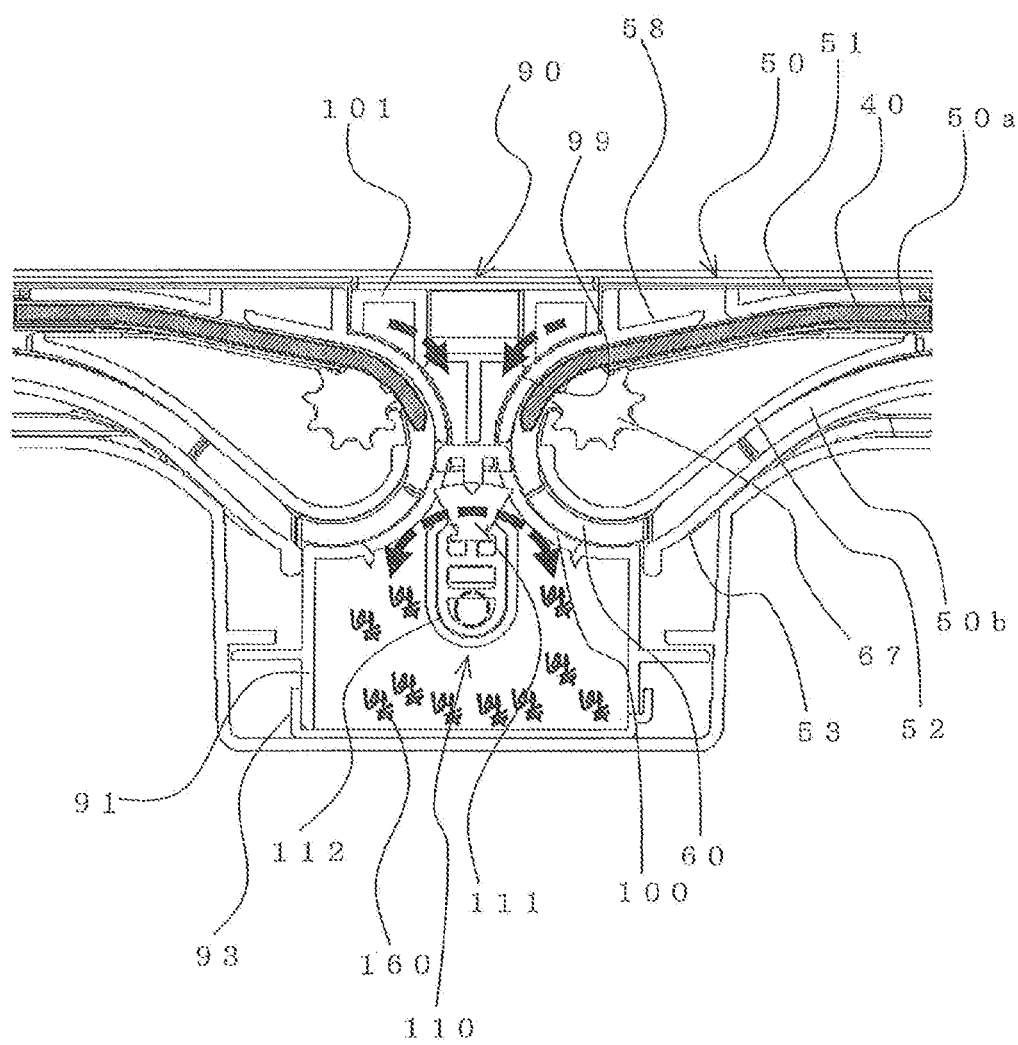
FIG. 16 is a front sectional view for illustrating the vicinity of the end portion of the cartridge on the dust box side in the indoor unit for an air-conditioning apparatus according to Embodiment 1 of the present invention.

FIG. 12 is a plan view for illustrating the vicinity of an end portion of the cartridge on the dust box side in the indoor unit for an air-conditioning apparatus according to Embodiment 1 of the present invention. FIG. 13 is a plan view for illustrating a filter moving gear body of a filter drive shaft illustrated in FIG. 12. FIG. 14 is a main part enlarged view of a portion D illustrated in FIG. 7(B). FIG. 15 is a perspective view for illustrating a motor unit of the indoor unit for an air-conditioning apparatus according to Embodiment 1 of the present invention. FIG. 16 is a front sectional view for illustrating the vicinity of the end portion of the cartridge on the dust box side in the indoor unit for an air-conditioning apparatus according to Embodiment 1 of the present invention. FIG. 12 is an illustration of the vicinity of the end portion of the cartridge 50 on the dust box 90 side in a state in which a filter holding member 58 described later is dismounted. FIG. 16 is an illustration of a state in which the cartridge 50 is mounted into the casing 1.

Now, the drive mechanism configured to move the filter 40 is described referring to FIG. 8 to FIG. 11 and FIG. 12 to FIG. 16.

The cartridge 50 according to Embodiment 1 includes an arc-shaped portion 59 formed at an end portion on the dust box 90 side (in other words, at an end portion on the side where the opening port 60 is formed). A filter drive shaft 67 configured to move the filter 40 is provided to the arc-shaped portion 59. More specifically, the filter drive shaft 67 is provided so as to extend along the fore-and-aft direction in a state in which the cartridge 50 is mounted into the casing 1. In other words, the filter drive shaft 67 is provided so as to be opposed to the opening port 60. The filter drive shaft 67 includes filter moving gear bodies 68 provided to both ends of the filter drive shaft 67 and a shaft portion 73 configured to couple the filter moving gear bodies 68.

Each of the filter moving gear bodies 68 includes a gear 69, a boss portion 70, and a coupling portion 71 configured to be coupled to a motor unit 140. The gears 69 each are arranged at positions opposed to corresponding side edge portions 43 and 44 of the filter 40. As illustrated in FIG. 7 and FIG. 14, the side edge portions 43 and 44 are side edge portions of the filter 40, which are opposed to each other. Tooth portions 46 are formed on the side edge portions 43 and 44. Specifically, the gears 69 mesh with the tooth portions 46 of the filter 40. The boss portion 70 is provided on an inner side of the gear 69. Specifically, the filter moving gear body 68 is configured to couple the boss portion 70 and the shaft portion 73 to each other. In Embodiment 1, the shaft portion 73 is formed to have a smaller diameter than that of the boss portion 70 of the filter moving gear body 68. The coupling portion 71 is provided on an outer side of the gear 69, specifically, to an end portion of the filter drive shaft 67.

The drive shaft 67 configured as described above is retained in the arc-shaped portion 59 of the cartridge 50 so as to be freely rotatable in the following manner.

A through hole 62 having a diameter that is larger than that of the coupling portion 71 of each of the filter moving gear bodies 68 and is smaller than that of the gear 69 of each of the filter moving gear bodies 68 is formed in a side surface 61 being a front-side side surface or a rear-side side surface of the arc-shaped portion 59 of the cartridge 50. By inserting the coupling portion 71 of the filter moving gear body 68 into the through hole 62, the filter drive shaft 67 is retained in the arc-shaped portion 59 of the cartridge 50 so as to be freely rotatable. A boss retaining portion 65 is provided at a position on, for example, the second frame 52 of the cartridge 50, which is opposed to the boss portion 70 of the filter moving gear body 68, and shaft retaining portions 63 are provided at positions opposed to the shaft portion 73.

A cutaway 66 that is open upward and formed by cutting away into an arc-like shape having a larger diameter than that of the boss portion 70 is formed in each of the boss retaining portions 65. A cutaway 64 that is open upward and formed by cutting away into an arc-like shape having a larger diameter than that of the shaft portion 73 is formed in each of the shaft retaining portions 63. Even through the retention of the boss portions 70 in the cutaways 66 of the boss retaining portions 65 so that the boss portions 70 are freely rotatable and the retention of the shaft portion 73 in the shaft retaining portions 63 so that the shaft portion 73 is freely rotatable, the filter drive shaft 67 is retained in the arc-shaped portion 59 of the cartridge 50 so as to be freely rotatable. Further, the cutaways 64 of the shaft retaining portions 63, which are provided so as to be opposed to the end portions on the inner side of the boss portions 70, are formed so as to have a smaller diameter than that of the boss portions 70. As a result, movement of the filter moving gear bodies 68 in the axial direction of the filter drive shaft 67 is restricted by the shaft retaining portions 63 and the side surface 61 of the cartridge 50.

As described above, the filter drive shaft 67 is coupled to the motor unit 140 so as to be driven. In Embodiment 1, as illustrated in FIG. 4, the motor unit 140 is provided behind the cartridge 50 (for example, on a rear surface 5 of the casing 1). The motor unit 140 has a configuration as illustrated in FIG. 15. Specifically, the motor unit 140 includes a motor 141 and output portions 142, each being connected to the motor 141 through intermediation of a gear. Further, the motor unit 140 includes the same number of the output portions 142 as the number of the cartridges 50, that is, the number of the filter drive shafts 67.

The end portion of the filter drive shaft 67, that is, the coupling portion 71 of the filter moving gear body 68 is inserted into each of the output portions 142. In Embodiment 1, at least one convex portion 72 is formed on an outer peripheral portion of the coupling portion 71 of the filter moving gear body 68. Further, the same number or a larger number of concave portions 143 as or than the number of the convex portions 72 are formed on an inner peripheral portion of each of the output portions 142 of the motor unit 140. By inserting the convex portion 72 of the coupling portion 71 of the filter moving gear body 68 into the concave portion 143 of the output portion 142 of the motor unit 140, the filter drive shaft 67 and the output portion 142 of the motor unit 140 are configured to be coupled to each other.

In this case, the motor 141 corresponds to a filter drive motor of the present invention. Further, the output portion 142 corresponds to an output portion of the filter drive motor of the present invention.

By setting the number of the concave portions 143 of each of the output portions 142 of the motor unit 140 larger than the number of the convex portions 72 of the coupling portion 71 of the filter moving gear body 68, the coupling between the filter drive shaft 67 and the motor unit 140 can be facilitated. Further, the concave portion 143 may be formed on the coupling portion 71 of the filter moving gear body 68, whereas the convex portion 72 may be formed on the output portion 142 of the motor unit 140. Still further, the motor unit 140 is not limited to be located at the position behind the cartridge 50. However, drive noise of the motor 141 can be blocked by the cartridge 50 and the dust box 90 described later by arranging the cartridge 50 and the dust box 90 in front of the motor unit 140 as in Embodiment 1.

When the motor 141 is driven in a state in which the filter drive shaft 67 and the output portion 142 of the motor unit 140 are coupled to each other, the output portion 142 coupled to the motor 141 through intermediation of the gear is rotationally driven. Further, the filter drive shaft 67 coupled to the output portion 142 is also rotationally driven. In this manner, the filter 40 having the tooth portions 46 that mesh with the gear 69 of the filter drive shaft 67 can be moved in the right-and-left direction inside the cartridge 50. Specifically, as illustrated in FIG. 16, the filter 40 located in the upper traveling path 50a is reversed through the arc-shaped portion 59 so as to be able to move into the lower traveling path 50b. Further, the filter 40 located in the lower traveling path 50b is reversed through the arc-shaped portion 59 so as to be able to move into the upper traveling path 50a. At this time, a portion of the filter 40, which is exposed from the opening port 60 formed in the arc-shaped portion 59 of the cartridge 50, is cleaned by the cleaning mechanism 110 of the dust box 90.

In Embodiment 1, when the filter 40 is reversed through the arc-shaped portion, the filter 40 is guided by a guiding portion 99 of the dust box 90, which is described later, so as to enable the movement between the upper traveling path 50a and the lower traveling path 50b more securely. The rotation of the motor 141 is controlled by the controller 150.

For the indoor unit 200 according to Embodiment 1, the following configuration is adopted so as to prevent a malfunction of the filter 40 inside the cartridge 50 and to prevent an operation of the indoor unit 200 in a state in which the filter 40 is not accommodated in the cartridge 50.

When tooth skipping occurs between the gear 69 of the filter drive shaft 67 and the tooth portions 46 of the filter 40, the filter 40 may malfunction. For example, when the amount of movement of the side edge portion 43 and that of the side edge portion 44 of the filter 40 differ from each other, the filter 40 may be caught in a traveling path. Therefore, as illustrated in FIG. 8 to FIG. 11 and other figures, the filter holding member 58 is provided to the cartridge 50 according to Embodiment 1 so as to be located above the filter drive shaft 67. The filter holding member 58 covers a part of the opening port 60 of the cartridge 50 so as to be freely openable and closeable. Further, in a state in which the filter holding member 58 covers the part of the opening port 60, the filter holding member 58 restricts the movement of the filter 40 so that the filter 40 does not move in a direction in which the filter drive shaft 67 escapes. By providing the filter holding member 58, the occurrence of tooth skipping between the gear 69 of the filter drive shaft 67 and the tooth portions 46 of the filter 40 can be prevented, thereby being capable of preventing the malfunction of the filter 40.

Further, the cartridge 50 according to Embodiment 1 has spaces partitioned by the bars 55, which have approximately the same sizes. Therefore, the filter 40 can be prevented from being caught in the traveling path at a higher degree.

For the movement of the filter 40 located in the upper traveling path 50a or the lower traveling path 50b to the end portion on the side opposite to the arc-shaped portion 59 (side opposed to the dust box 90), when the filter 40 is caused to be moved even after the arrival of the filter 40 at the end portion, the filter 40 is deformed in the upper traveling path 50a or the lower traveling path 50b so that the filter 40 may be caught in the upper traveling path 50a or the lower traveling path 50b. Therefore, as illustrated in FIG. 14, a stopper portion 48 is formed on the end portions of the tooth portions 46 formed on the side edge portions 43 and 44 of the filter 40 according to Embodiment 1. The stopper portion 48 reaches the position of the filter drive shaft 67 to prevent the filter drive shaft 67 from moving the filter 40. Therefore, excessive movement of the filter 40 can be prevented, thereby being capable of preventing the filter 40 from being caught in the upper traveling path 50a or the lower traveling path 50b.

Figure 17:
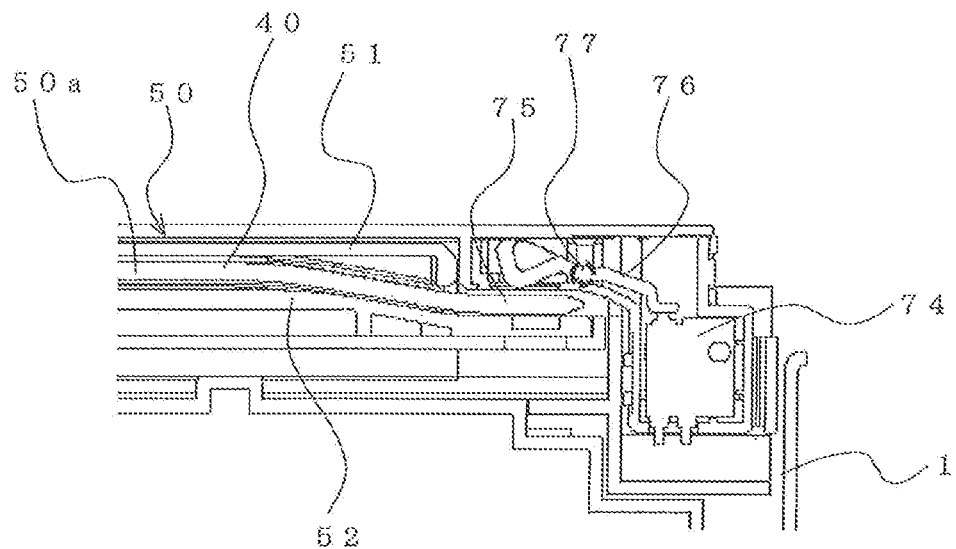
FIG. 17 is a front sectional view for illustrating the vicinity of an end portion of the cartridge, which is located on a side opposite to the dust box, in the indoor unit for an air-conditioning apparatus according to Embodiment 1 of the present invention.
Figure 18:
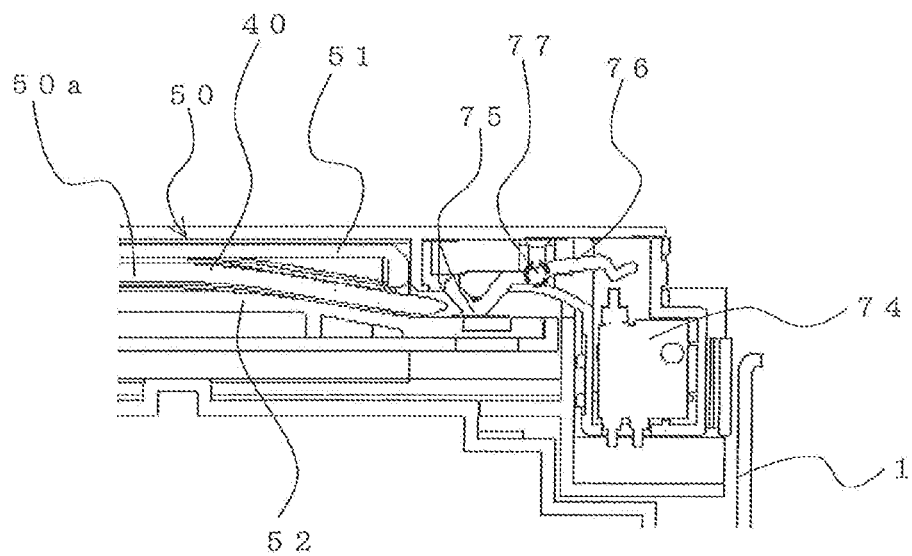
FIG. 18 is a front sectional view for illustrating the vicinity of the end portion of the cartridge, which is located on the side opposite to the dust box, in the indoor unit for an air-conditioning apparatus according to Embodiment 1 of the present invention.

FIG. 17 and FIG. 18 are front sectional views for illustrating the vicinity of the end portion of the cartridge, which is located on the side opposite to the dust box, in the indoor unit for an air-conditioning apparatus according to Embodiment 1 of the present invention.

As illustrated in FIG. 8 to FIG. 11 and other figures, opening ports 75 being filter detection opening ports are formed in, for example, the upper surface of the cartridge 50 according to Embodiment 1 at positions opposed to the filter 40 in a state in which the filter 40 located in the upper traveling path 50a is arranged at a regular position (position at which the filter 40 completely covers the ventilation ports 54). Further, as illustrated in FIG. 17 and FIG. 18, for the casing 1, a filter detection lever 76 is provided at a position at which the opening ports 75 of the cartridge 50 and one of the end portions are opposed to each other in a state in which the cartridge 50 is arranged at a regular position in the casing 1 (position at which the filter drive shaft 67 and the motor unit 140 are coupled to each other). The filter detection lever 76 is provided so as to be pivotable in a vertical direction about a rotary shaft 77 as a center of pivot. Further, for the casing 1, a filter detection switch 74 is provided at a position opposed to the other end portion of the filter detection lever 76.

As illustrated in FIG. 18, the filter detection lever 76 is urged by, for example, a spring in a direction in which the filter detection lever 76 does not press the filter detection switch 74. As illustrated in FIG. 17, when the filter 40 is arranged at the regular position inside the cartridge 50 that is mounted at the regular position, one end portion of the filter detection lever 76 is pushed up by the filter 40, whereas the filter detection switch 74 is pushed by the other end portion of the filter detection lever 76. Specifically, when the filter 40 is arranged at the regular position inside the cartridge 50 that is mounted at the regular position, the filter 40 presses the filter detection switch 74 through the opening ports 75. In this case, the controller 150 according to Embodiment 1 is configured not to operate the indoor unit 200 (for example, rotationally drive the axial-flow fans 20) in a state in which the filter detection switch 74 is not pressed. Therefore, the indoor unit 200 according to Embodiment 1 can prevent the operation of the indoor unit 200 in a state in which the filter 40 is not accommodated in the cartridge 50.

The cartridge 50 according to Embodiment 1 is not limited to the configuration described above. As illustrated in FIG. 4, in Embodiment 1, a placement portion 15 for placement of the cartridge 50 thereon is provided to the casing 1 so that the cartridge 50 is supported from a lower side by the placement portion 15. When the placement portion 15 is provided as described above, the third frame 53 of the cartridge 50 may be formed integrally with the placement portion 15. In this case, the upper traveling path 50a is formed between the first frame 51 and the second frame 52, whereas the lower traveling path 50b is formed between the second frame 52 and the placement portion 15. Thus, the first frame 51 and the second frame 52 have a configuration freely mountable into and dismountable from the casing 1. In this case, the first frame 51 corresponds to the upper frame of the present invention, whereas the second frame 52 corresponds to the lower frame of the present invention.

The indoor unit 200 according to Embodiment 1 uses the axial-flow fans 20 as described above. In such a case, the bars 55 of the cartridge 50 may be configured as follows.

Figure 19:
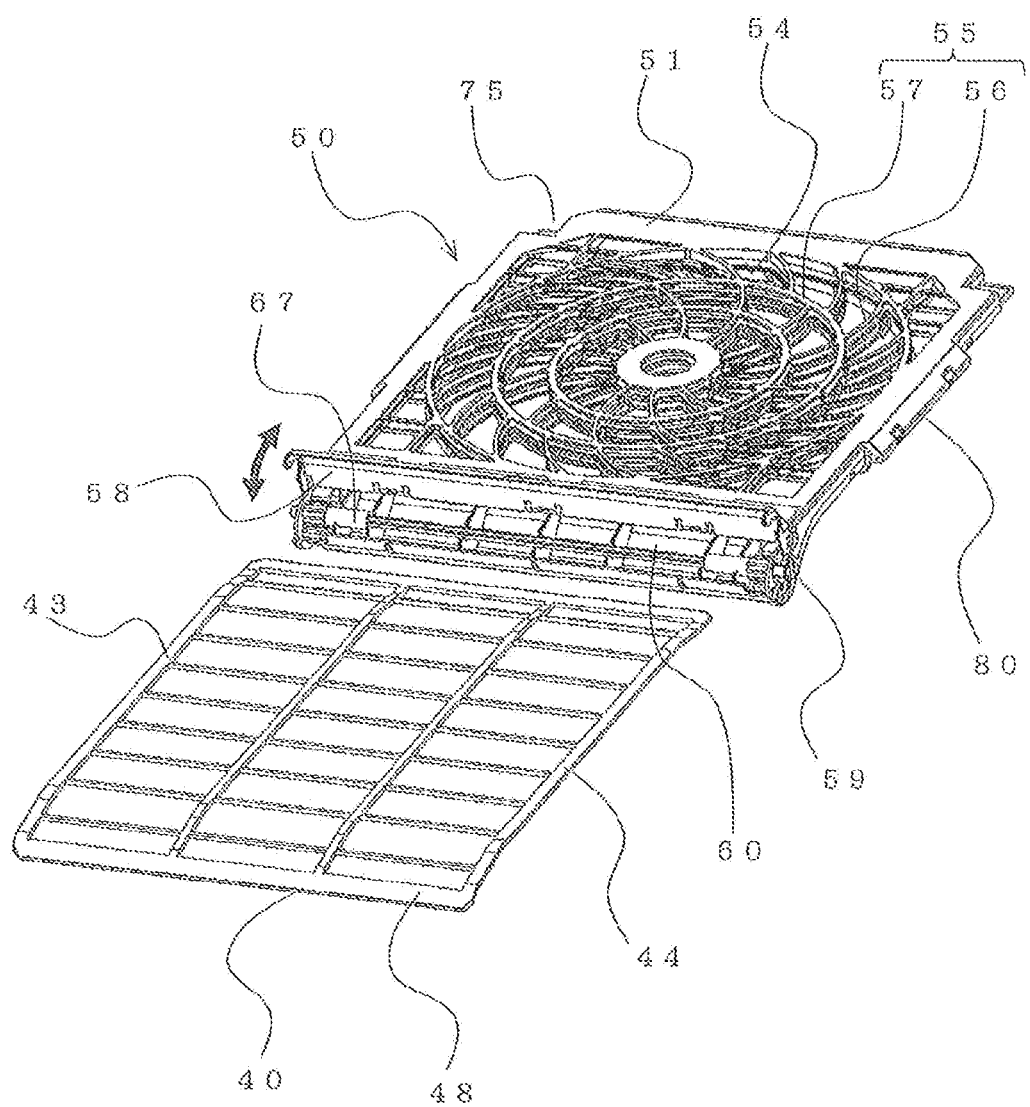
FIG. 19 is an assembly perspective view for illustrating another example of the cartridge according to Embodiment 1 of the present invention.
Figure 20:
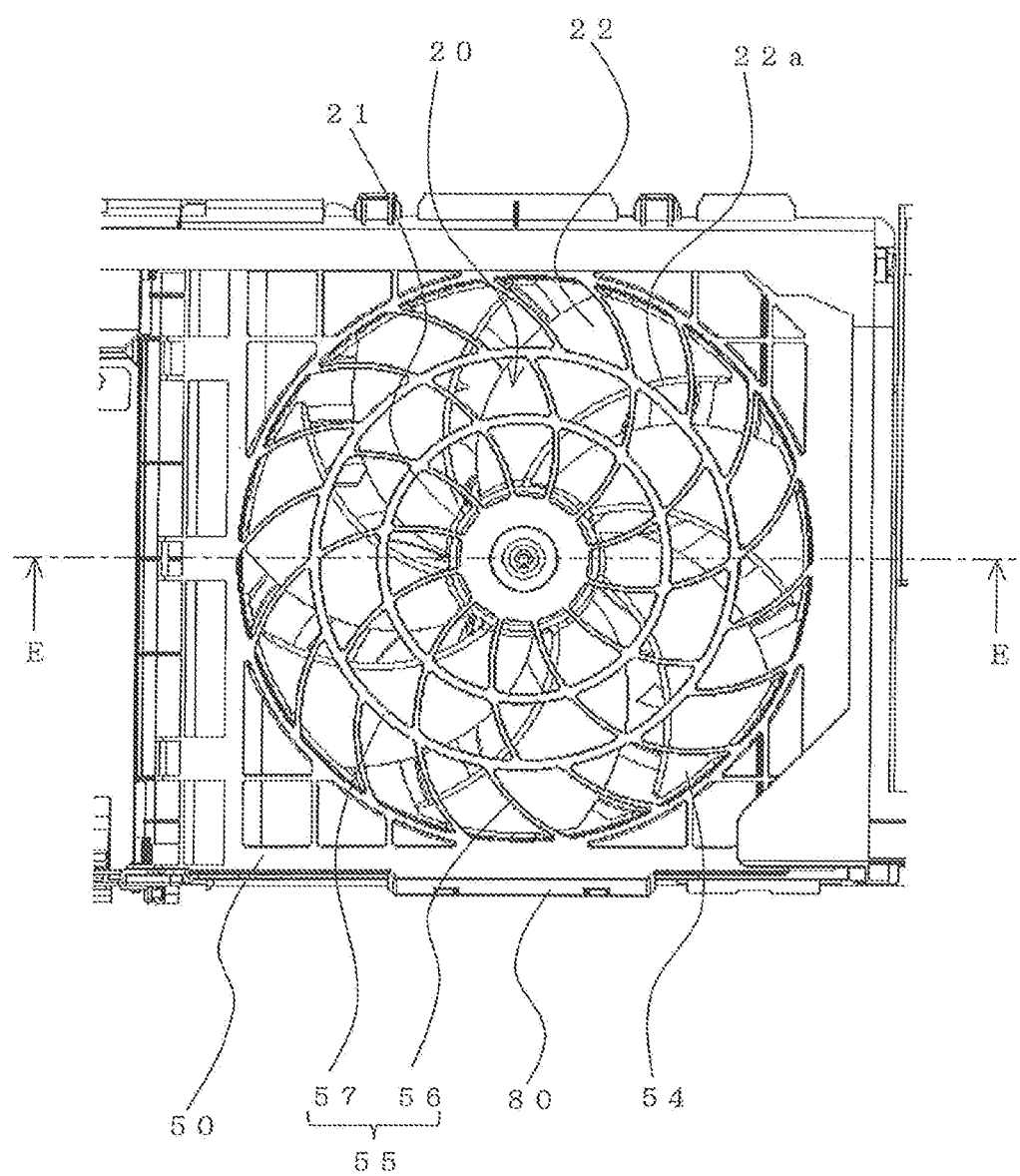
FIG. 20 is a plan view for illustrating a state in which the cartridge illustrated in FIG. 19 is mounted into a casing.
Figure 21:
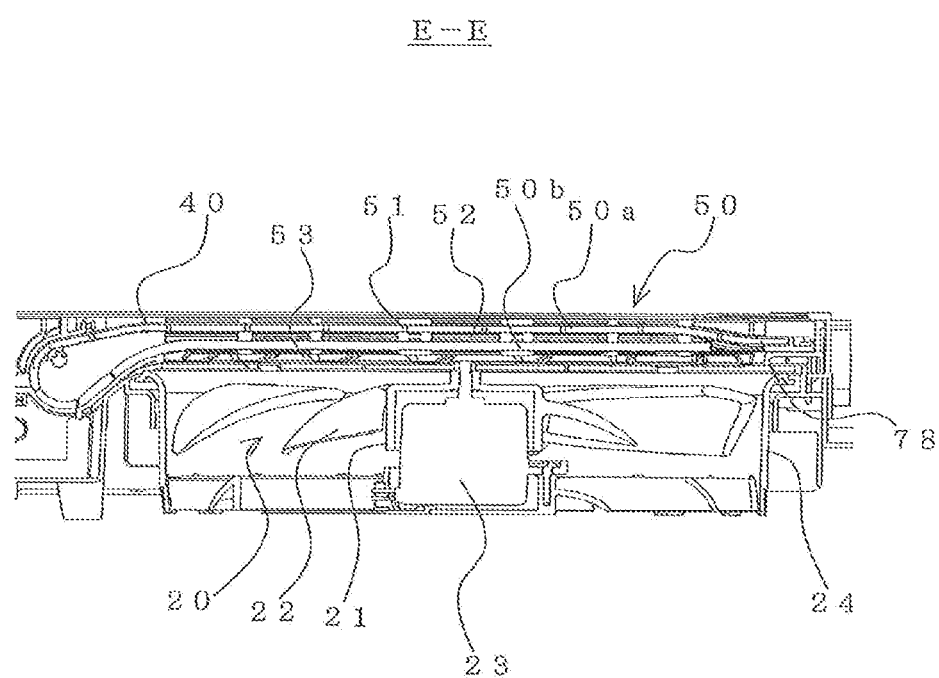
FIG. 21 is a sectional view of FIG. 20, taken along the line E-E.

FIG. 19 is an assembly perspective view for illustrating another example of the cartridge according to Embodiment 1 of the present invention. FIG. 20 is a plan view for illustrating a state in which the cartridge is mounted into the casing. FIG. 21 is a sectional view of FIG. 20, taken along the line E-E.

The bars 55 of the cartridge 50 include a plurality of first bars 56 that are radially extended from the rotary shaft (boss portion 21) of the axial-flow fan 20 in plan view. The plurality of first bars 56 are arranged at equal pitches or unequal pitches. In order to suppress noise generated in the axial-flow fan 20, the first bars 56 are formed into a linear shape or an arc-like shape inclined in a direction opposite to a direction of rotation of the axial-flow fan 20 (clockwise direction in FIG. 20) from the rotary shaft (boss portion 21) side of the axial-flow fan 20 to an outer peripheral side in plan view.

Specifically, a speed loss area (area in which a flow rate is low) is generated in a slipstream behind the bars 55 (airstream on a downstream side). Therefore, when leading edge portions 22a of the blades 22 of the axial-flow fan 20 interfere with the slipstream behind the bars 55, a sudden pressure fluctuation occurs. Therefore, as a range of interference between the leading edge portions 22a of the blades 22 and the slipstream behind the bars 55 increases, in other words, as a range of overlap between the bars 55 and the leading edge portions 22a of the blades 22 in plan view increases, the noise increases.

In this case, the leading edge portions 22a of the blades 22 of the axial-flow fan 20 are formed into a linear shape or an arc-like shape inclined in the direction of rotation of the axial-flow fan 20 from the rotary shaft side of the axial-flow fan 20 to the outer peripheral side in plan view (as viewed in a direction of the rotary shaft of the axial-flow fan 20). On the other hand, the first bars 56 of the cartridge 50 are formed into the linear shape or the arc-like shape inclined in the direction opposite to the direction of rotation of the axial-flow fan 20 from the rotary shaft side of the axial-flow fan 20 to the outer peripheral side in plan view. Therefore, the cartridge 50 of Embodiment 1 can reduce the range of interference between the leading edge portions 22a of the blades 22 and the slipstream behind the first bars 56, in other words, the range of overlap between the first bars 56 and the leading edge portions 22a of the blades 22 in plan view can be reduced. As a result, the noise generated in the axial-flow fan 20 can be suppressed.

In particular, when the leading edge portions 22a of the blades 22 are formed into the arc-like shape that is convex in the direction opposite to the direction of rotation of the axial-flow fan 20 as illustrated in FIG. 20, each of the first bars 56 only needs to be formed into an arc-like shape that is convex in the direction of rotation of the axial-flow fan 20. With the configuration described above, the first bars 56 and the leading edge portions 22a of the blades 22 overlap in a state closer to a vertical state in plan view. Therefore, the noise generated in the axial-flow fan 20 can be further suppressed.

When the first bars 56 are adopted for the bars 55 of the cartridge 50, the number of the first bars 56 and the number of the blades 22 of the axial-flow fan 20 may be set to have a relationship in which the numbers are prime numbers. Portions in which the leading edge portions 22a of the blades 22 and the slipstream behind the first bars 56 interfere with each other can be reduced, and therefore the noise generated in the axial-flow fan 20 can be further suppressed.

When the first bars 56 are adopted for the bars 55 of the cartridge 50, the bars 55 may include at least one second bar 57 having a circular shape with the rotary shaft (boss portion 21) of the axial-flow fan 20 as a center in plan view, as illustrated in FIG. 19 and FIG. 20. Strength of the cartridge 50, in other words, strength in the vicinity of the ventilation ports 54 can be improved.

When the second bar 57 is provided, it is preferred to set the number of the first bars on an inner peripheral side and the number of the first bars on an outer peripheral side different from each other for the at least one second bar 57. For example, when the first bars 56 are formed on the inner peripheral side and the outer peripheral side of the second bar 57, it is preferred to set the number of the first bars 56 provided on the outer peripheral side of the second bar 57 larger than the number of the first bars 56 provided on the inner peripheral side of the second bar 57. The dimensions of the spaces partitioned by the first bars 56 and the second bar 57 can be set to approximately the same dimensions. Therefore, the filter 40 can be prevented from being caught in the traveling path. Further, when the strength of the cartridge 50 is ensured, the first bars 56 may be formed only on the outer peripheral side of the second bar 57. The second bar 57 may be formed by connecting the adjacent first bars 56 with linear bars. The thus formed second bar 57 has an approximately circular shape. In Embodiment 1, the approximately circular shape as described above is also referred to as "circular shape".

When the axial-flow fan 20 is adopted as the fan of the indoor unit 200, a flange portion 78 formed into a circular shape with a diameter equal to or larger than that of an upper opening port of the bellmouth 24 may be provided on an outer peripheral side of the ventilation port 54 formed on the lower surface of the cartridge 50, in other words, on an outer peripheral side of the bars 55 provided to the ventilation port 54 so as to project toward the bellmouth 24. The same effects as those obtained when the bellmouth 24 is extended in the vertical direction (direction of the rotary shaft of the axial-flow fan 20) are obtained. Therefore, the noise generated in the axial-flow fan 20 can be further suppressed. At this time, it is preferred not to form an opening port other than the ventilation port 54 in the lower surface of the cartridge 50. In other words, it is preferred not to form the opening port on an outer peripheral side of the flange portion 78. Air is not sucked into the cartridge 50 other than through the air inlet 2, and therefore the air flows smoothly into the bellmouth 24. Therefore, the noise generated in the axial-flow fan 20 can be further suppressed. The noise suppression effects can also be obtained even when the bars 55 formed in a grid pattern are adopted.

(Dust Box 90 and Cleaning Mechanism 110)

Figure 22:
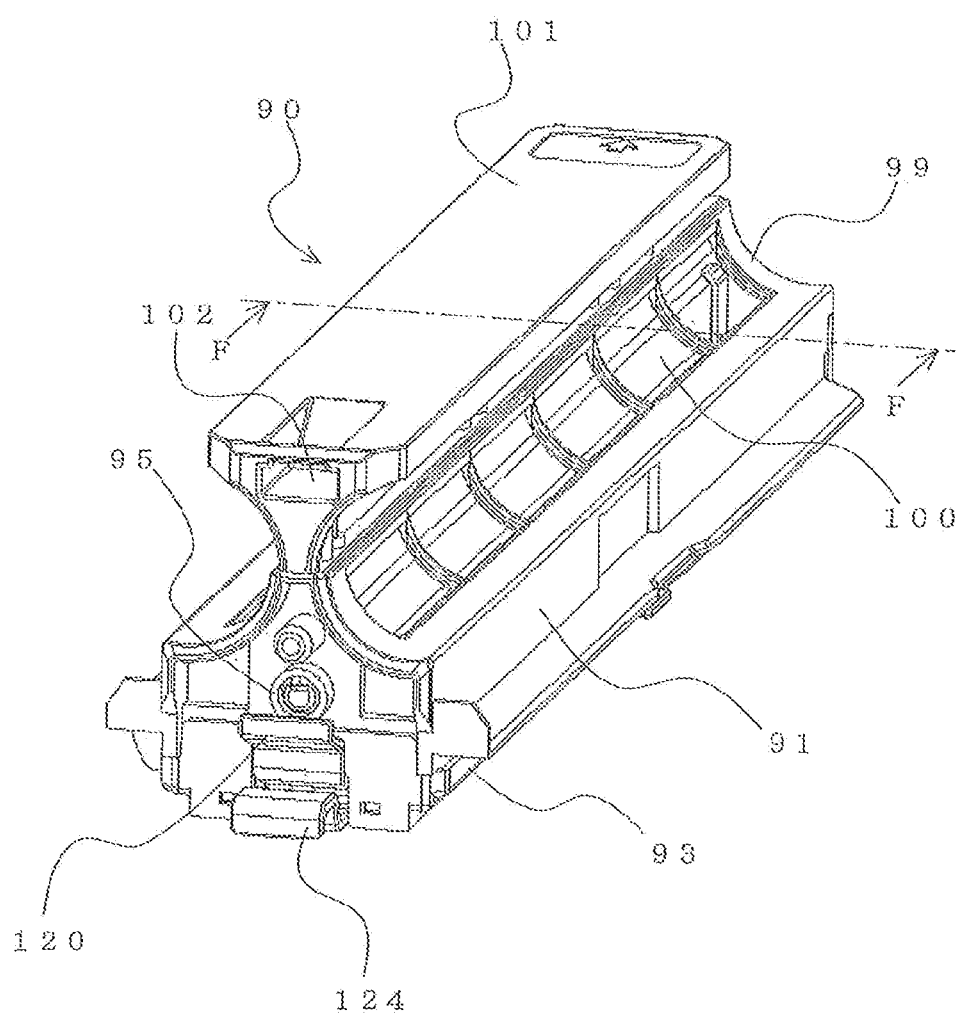
FIG. 22 is an assembly perspective view for illustrating the dust box of the indoor unit for an air-conditioning apparatus according to the present invention.
Figure 23:
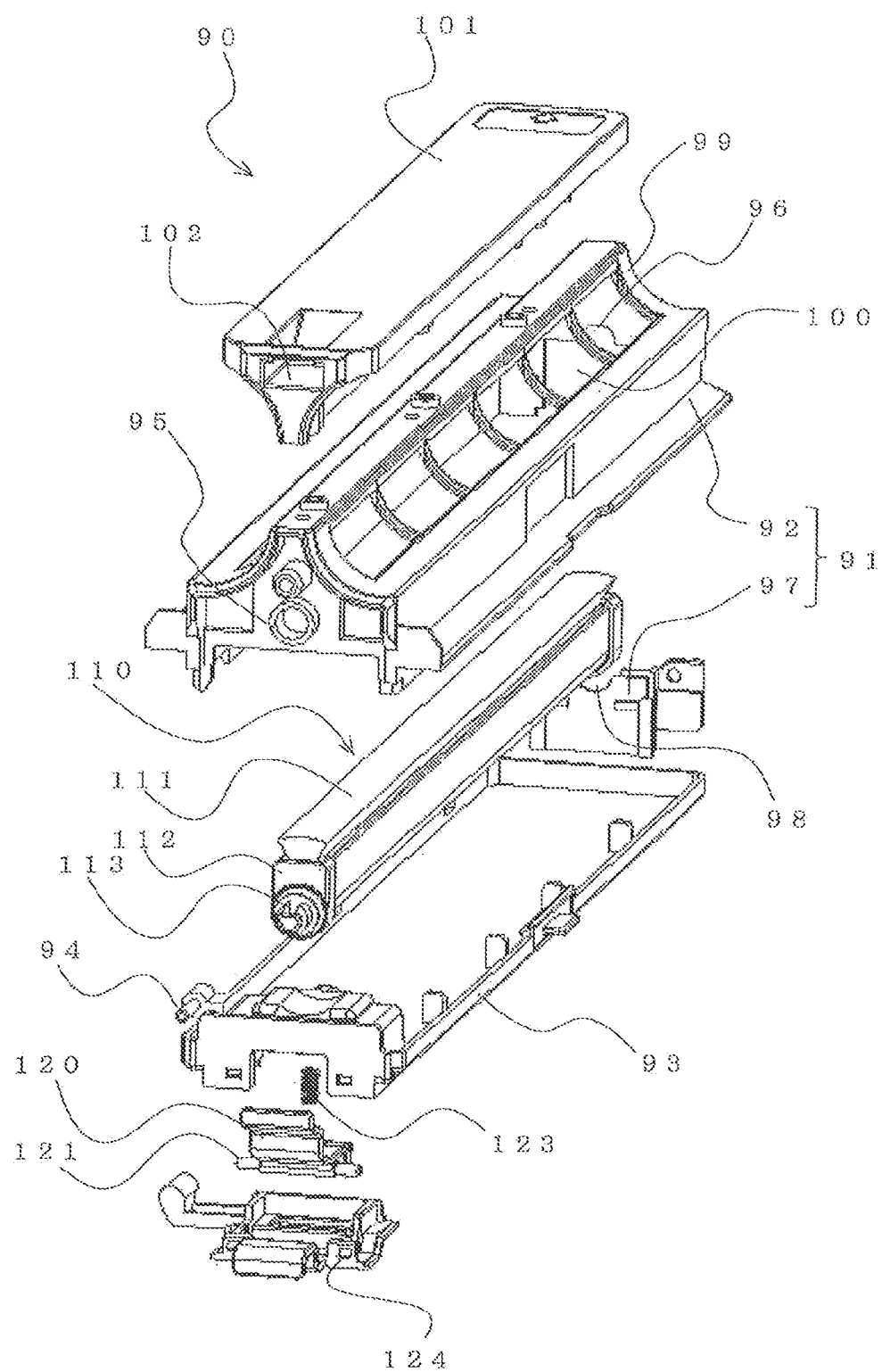
FIG. 23 is an exploded perspective view for illustrating the dust box of the indoor unit for an air-conditioning apparatus according to the present invention.
Figure 24:
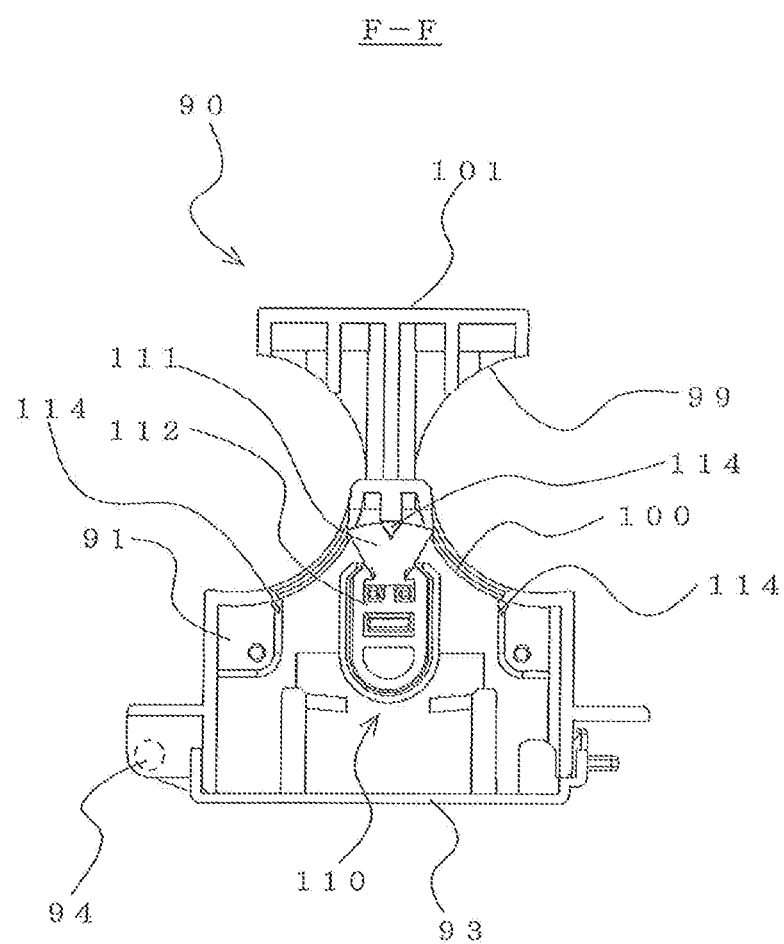
FIG. 24 is a sectional view of FIG. 22, taken along the line F-F, for illustrating a state in which a lid portion is closed.
Figure 25:
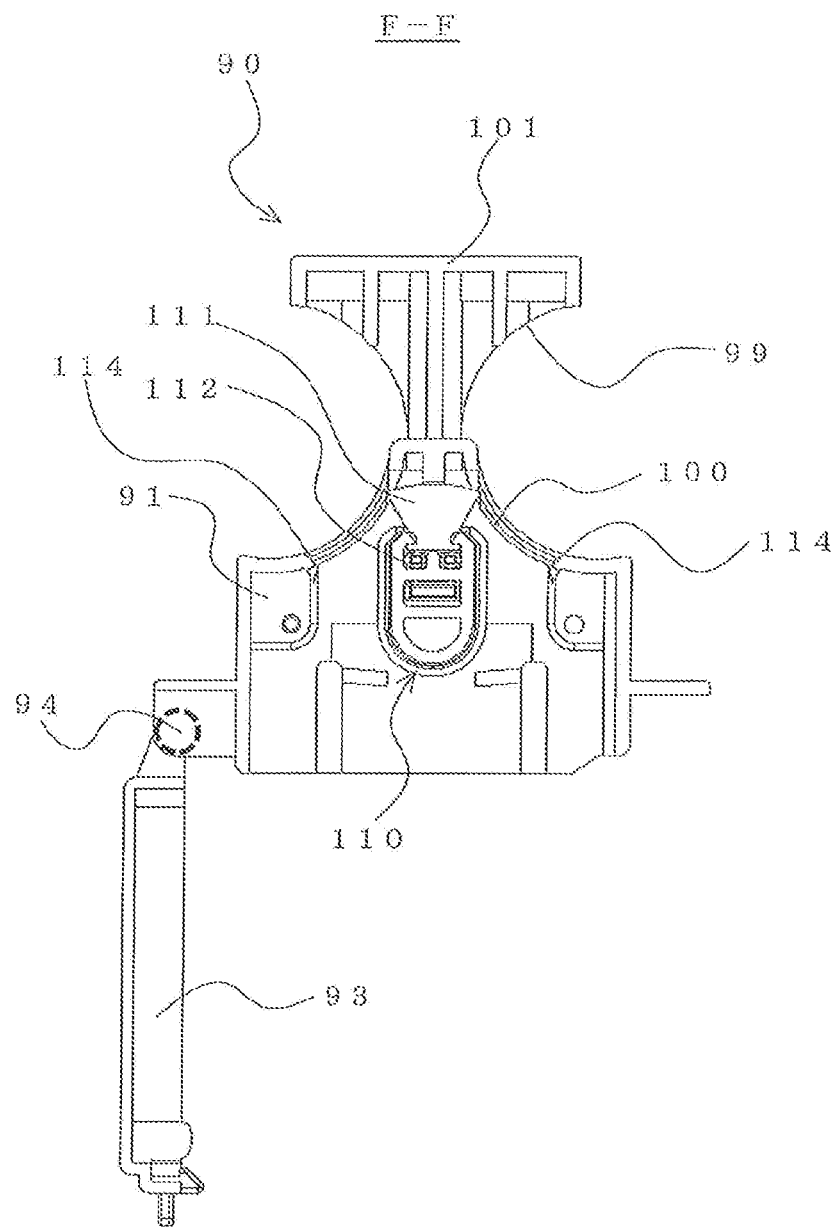
FIG. 25 is a sectional view of FIG. 22, taken along the line F-F, for illustrating a state in which the lid portion is open.
Figure 26:
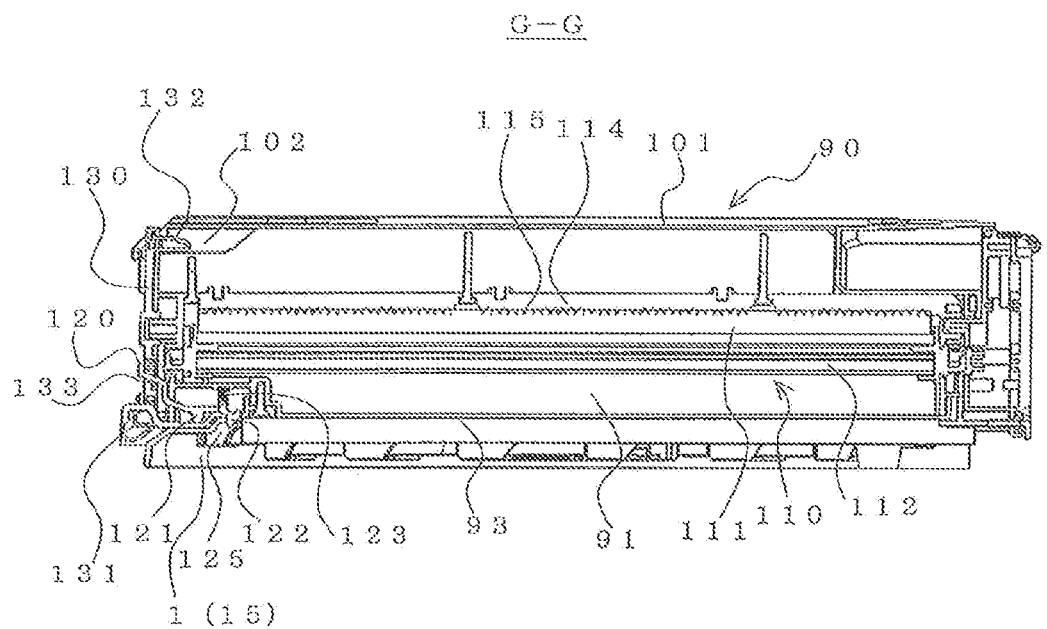
FIG. 26 is a sectional view of FIG. 1, taken along the line G-G, for illustrating a state in which a stopper is closed.
Figure 27:
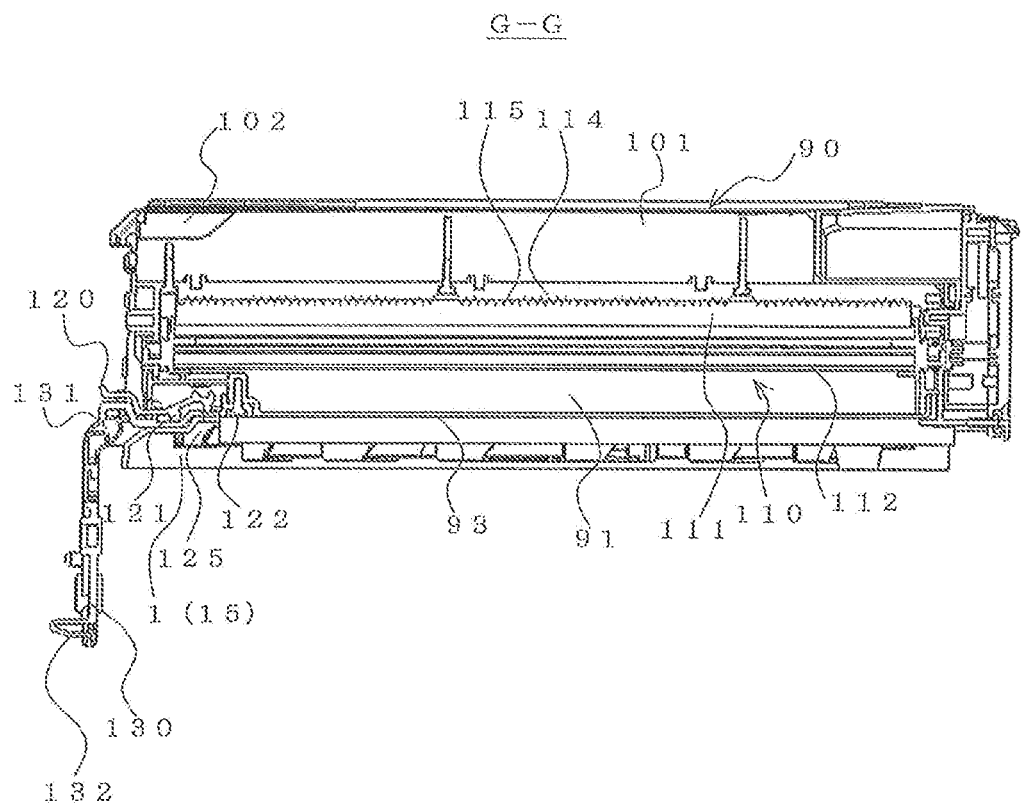
FIG. 27 is a sectional view of FIG. 1, taken along the line G-G, for illustrating a state in which the stopper is open.

FIG. 22 is an assembly perspective view for illustrating the dust box of the indoor unit for an air-conditioning apparatus according to the present invention. FIG. 23 is an exploded perspective view for illustrating the dust box. FIG. 24 is a sectional view of FIG. 22, taken along the line F-F, for illustrating a state in which a lid portion is closed. FIG. 25 is a sectional view of FIG. 22, taken along the line F-F, for illustrating a state in which the lid portion is open. FIG. 26 is a sectional view of FIG. 1, taken along the line G-G, for illustrating a state in which a stopper is closed. FIG. 27 is a sectional view of FIG. 1, taken along the line G-G, for illustrating a state in which the stopper is open.

The dust box 90 includes the dust collecting portion 91 configured to collect the dust removed from the filter 40 by the cleaning mechanism 110. The dust box 90 is provided on one end portion side of the cartridge 50 in the right-and-left direction. Further, the indoor unit 200 according to Embodiment 1 is configured to collect the dust removed from the filters 40 accommodated in the two cartridges 50 in the single dust box. Therefore, the indoor unit 200 according to Embodiment 1 is provided between the two cartridges 50 opposed to each other in the right-and-left direction. Further, in Embodiment 1, as described above, the dust box 90 includes the cleaning mechanism 110. Therefore, the two cartridges 50 are provided so that an end portion on the side where the opening port 60 configured to expose the filter 40 therethrough is formed and the dust box 90 are opposed to each other. In other words, the two cartridges 50 respectively have the opening ports 60 formed in the end portions in the right-and-left direction on the sides opposed to each other.

The dust box 90 arranged as described above is provided so as to be freely mountable into and dismountable from the casing 1 in the fore-and-aft direction, and includes the dust collecting portion 91, an upper surface 101 provided to an upper part of the dust collecting portion 91, a lid portion 93 configured to close a lower opening of the dust collecting portion 91 so as to be freely openable and closable, and the cleaning mechanism 110.

The dust collecting portion 91 includes a main body portion 92 and a support member 97 forming a lower part of a rear surface of the dust collecting portion 91, and is formed so as to have an approximately box-like shape having a lower portion being open. The dust collecting portion 91 is made of a transparent resin so that the amount of dust collected therein can be visually recognized. Further, the guiding portion 99 having an arc-like cross sectional shape is formed on a side surface of the dust collecting portion 91 on a side opposed to the cartridge 50 along the fore-and-aft direction. The dust box 90 according to Embodiment 1 is provided between the two cartridges 50. Therefore, the dust collecting portion 91 has the guiding portions 99 on both side surfaces. The guiding portion 99 has a shape corresponding to the shape of the arc-shaped portion 59 of the cartridge 50, and functions as a guide configured to guide the cartridge 50 to a regular mounting position when the cartridge 50 is mounted into the casing 1 in a state in which the dust box 90 is mounted into the casing 1. The guiding portion 99 also has a function of guiding the filter 40 when the filter 40 moves between the upper traveling path 50a and the lower traveling path 50b inside the cartridge 50, in other words, when the filter 40 passes through the arc-shaped portion 59 of the cartridge 50.

The guiding portion 99 of the dust collecting portion 91 has an opening port 100 formed at a position opposed to the opening port 60 of the cartridge 50. Specifically, the cleaning mechanism 110 included in the dust box 90, which is described later, is configured to clean the filter 40 through the opening port 100 and the opening port 60 of the cartridge 50.

The upper surface 101 forms a part of the upper surface 6 of the casing 1 in Embodiment 1. A top panel for covering an upper part of the dust box 90 is not required. Therefore, the number of components can be reduced. Further, the upper surface 101 is formed as a component independent of the dust collecting portion 91, and is in the same color as that of the casing 1. With the configuration described above, the design properties of the indoor unit 200 can be improved.

The lid portion 93 includes a rotary shaft 94 that is mounted to the dust collecting portion 91 so as to be freely rotatable, and is mounted to the dust collecting portion 91 through intermediation of the rotary shaft 94 so as to be freely rotatable. In this manner, the lid portion 93 closes the lower opening of the dust collecting portion 91 so as to be freely openable and closable. Specifically, the dust box 90 is configured to allow the dust collected in the dust collecting portion 91 to be removed by opening the lid portion 93.

The cleaning mechanism 110 includes a brush 111 configured to clean the filter 40 and a brush drive shaft 112 to which the brush 111 is mounted, and which is configured to rotate or swing the brush 111. The brush drive shaft 112 is retained on a front surface and a rear surface of the dust collecting portion 91 so as to be freely rotatable. More specifically, an insertion hole 95 into which a front end portion of the brush drive shaft 112 is inserted is formed in a front surface of the main body portion 92 of the dust collecting portion 91. Through the insertion hole 95, the front end portion of the brush drive shaft 112 is retained so as to be freely rotatable. An arc-like cutaway 96 is formed in a lower end of a rear surface of the main body portion 92. An arc-like cutaway 98 is formed in an upper end of the support member 97 that is provided below the rear surface of the main body portion 92 so as to be located at a position opposed to the cutaway 96. A rear end portion of the brush drive shaft 112 is interposed between the cutaway 96 and the cutaway 98 so as to be freely rotatable. As a result, the rear end portion of the brush drive shaft 112 is retained so as to be freely rotatable.

The above-mentioned brush drive shaft 112 is coupled to the motor unit 140 so as to be driven by the motor unit 140. More specifically, as illustrated in FIG. 15, the motor unit 140 includes an output portion 144 in addition to the output portions 142. The output portion 144 is connected to the motor 141 through intermediation of a gear, and is configured to be swung or rotated through the rotation of the motor 141. The rear end portion of the brush drive shaft 112 is inserted into the output portion 144.

In this case, the motor 141 corresponds to a brush drive motor of the present invention. Further, the output portion 144 corresponds to an output portion of the brush drive motor of the present invention.

In Embodiment 1, at least one convex portion 145 is formed on an inner peripheral portion of the output portion 144 of the motor unit 140. The same number or a larger number of concave portions 113 as or than the number of the convex portions 145 are formed on an outer peripheral portion of the rear end portion of the brush drive shaft 112 (the brush drive shaft 112 according to Embodiment 1 is formed into a longitudinally symmetrical shape, and therefore the concave portion 113 of the brush drive shaft 112 is illustrated on the front end portion of the brush drive shaft 112 in FIG. 23). The convex portion 145 of the output portion 144 is inserted into the concave portion 113 of the brush drive shaft 112, thereby coupling the brush drive shaft 112 and the output portion 144 of the motor unit 140 to each other. By setting the number of the concave portions 113 of the brush drive shaft 112 larger than the number of the convex portions 145 of the output portion 144 of the motor unit 140, the coupling between the brush drive shaft 112 and the motor unit 140 can be facilitated. The concave portion 113 may be formed on the output portion 142 of the motor unit 140, whereas the convex portion 145 may be formed on the brush drive shaft 112.

When the motor 141 is driven in a state in which the brush drive shaft 112 and the output portion 144 of the motor unit 140 are coupled to each other, the output portion 144 coupled to the motor 141 through intermediation of the gear is swung or rotated. Along with the swing or rotation, the brush drive shaft 112 and the brush 111 are also swung or rotated. As a result, as illustrated in FIG. 16, the brush 111 projecting from the opening port 100 of the dust box 90 removes the dust from the portion of the filter 40, which is exposed from the opening port 60 of the cartridge 50.

The dust adheres to the brush 111. Therefore, at least one scraper 114 configured to scrape off the dust adhering to the brush 111 is provided to the dust collecting portion 91 of the dust box 90. The scraper 114 is provided so as to extend along the fore-and-aft direction. Convexo-concave portions 115 are continuously formed on a distal end portion along an extending direction.

As described above, the indoor unit 200 according to Embodiment 1 includes the dust box 90 and the cleaning mechanism 110 on the side of the end portion of the cartridge 50 in the right-and-left direction. Therefore, the dust box 90 and the cleaning mechanism 110 can be arranged above the heat exchanger 30. Therefore, the indoor unit 200 according to Embodiment 1 is capable of preventing the dimension of the indoor unit 200 in the fore-and-aft direction from being increased and also capable of preventing the shape and the size of the heat exchanger 30 from being limited while having an automatic cleaning function for the filter 40.

In Embodiment 1, a plurality of the scrapers 114 are provided so as to more securely scrape off the dust adhering to the brush 111. The adjacent scrapers 114 are formed so that concave portions and convex portions of the convexo-concave portions 115 are shifted from each other.

As illustrated in FIG. 16, in Embodiment 1, the single brush 111 is configured to clean the two filters 40. When the brush 111 is caused to swing to clean the two filters 40, it is preferred to provide the scrapers 114 at three positions in total including a cleaning portion (opening port 100) for the filter 40 and two positions corresponding to swinging ends of the brush 111, as illustrated in FIG. 24. With the configuration described above, the brush 111 and the scrapers 114 come into contact before the cleaning of each of the filters 40. Therefore, re-adhesion of the dust removed by the brush 111 to the filters 40 can be suppressed, thereby improving cleaning performance for the filters 40.

A fixing lever 120 is provided to the above-mentioned dust box 90 so as to fix the dust box 90 at a regular position in the casing 1 (position at which the brush drive shaft 112 and the motor unit 140 are coupled to each other). The fixing lever 120 includes a rotary shaft 121 that is provided so as to project in the right-and-left direction. The rotary shaft 121 is retained between a lower portion of the lid portion 93 and a fixing-lever lid 124 so as to be freely rotatable. In this manner, a front end portion and a rear end portion of the fixing lever 120 are freely swingable in the vertical direction. Further, a fixing-lever hook portion 122 is formed on the rear end portion of the fixing lever. The fixing-lever hook portion 122 is engaged with a dust-box engaging portion 125 that is an opening port formed in the casing 1 (for example, the placement portion 15) in a state in which the dust box 90 is arranged at the regular position in the casing 1. The rear end portion of the fixing lever 120, specifically, the fixing-lever hook portion 122 is pressed by a spring 123 from above. Therefore, a state in which the fixing-lever hook portion 122 is engaged with the dust-box engaging portion 125 is kept. By pushing down the front end portion of the fixing lever 120, the engagement between the fixing-lever hook portion 122 and the dust-box engaging portion 125 is cancelled to enable the dust box 90 to be dismounted from the casing 1. By fixing the dust box 90 in the casing 1 as described above, the rear end portion of the brush drive shaft 112 can be prevented from falling out of the output portion 144 of the motor unit 140 during the automatic cleaning of the filter 40.

Although the two filters 40 are configured to be cleaned by the single brush 111 in Embodiment 1, two brushes 111 and two brush drive shafts 112 may be provided in the dust box 90 so as to respectively correspond to the filters 40. Further, the dust box 90 may be provided for each of the cartridges 50. When the axial-flow fans 20 are used as in Embodiment 1, a dead space that is not used as an air duct is formed between the adjacent axial-flow fans 20. Therefore, when the cartridges 50 are provided so as to respectively correspond to the axial-flow fans 20 (respectively for the axial-flow fans), the dead space can be effectively used by providing the dust box 90 between the adjacent cartridges 50 as in Embodiment 1, thereby enabling downsizing of the indoor unit 200.

(Stopper 130)

Figure 28:
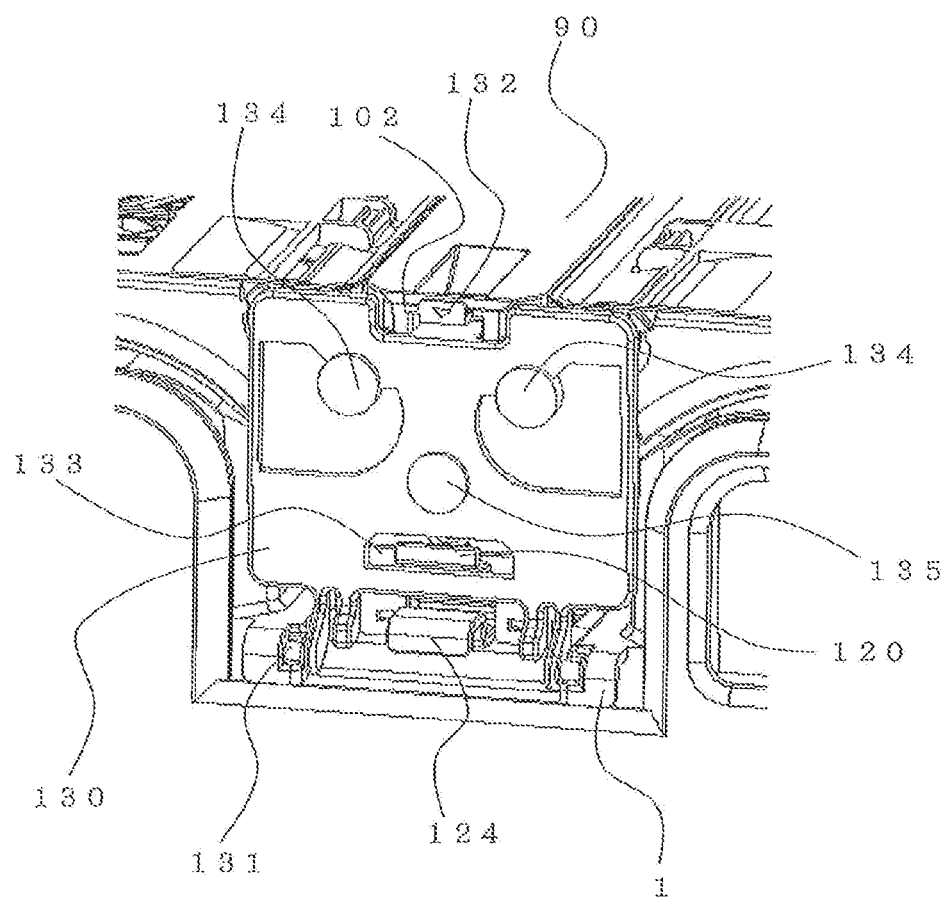
FIG. 28 is a perspective view for illustrating the stopper of the indoor unit for an air-conditioning apparatus according to Embodiment 1 of the present invention.
Figure 29:
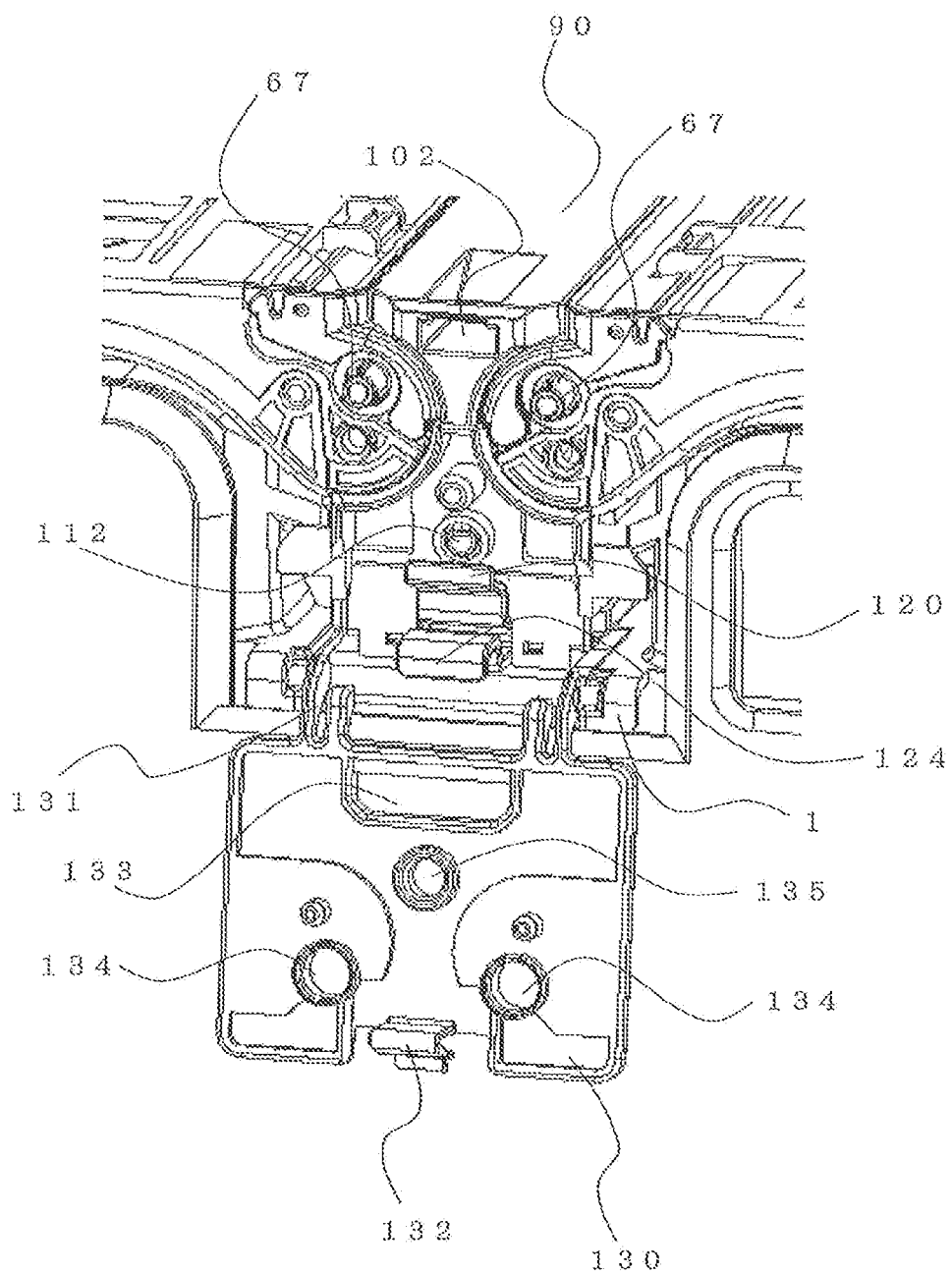
FIG. 29 is a perspective view for illustrating the stopper of the indoor unit for an air-conditioning apparatus according to Embodiment 1 of the present invention.

FIG. 28 and FIG. 29 are perspective views for illustrating the stopper of the indoor unit for an air-conditioning apparatus according to Embodiment 1 of the present invention. FIG. 28 is an illustration of a state in which the stopper 130 is open. FIG. 29 is an illustration of a state in which the stopper 130 is closed.

The stopper 130 according to Embodiment 1 is a plate-like member having an approximately rectangular shape, and is arranged in front of the dust box 90. The stopper 130 has a lower end portion that is mounted to the casing 1 through intermediation of a rotary shaft 131 so as to be freely rotatable. An upper end portion of the stopper 130 is fixed directly or indirectly to the casing 1 so as to be freely mountable and dismountable. Specifically, in a state in which the stopper 130 is fixed to the casing 1 (in a state illustrated in FIG. 29 in which the stopper 130 is closed), the stopper 130 can restrict the dust box 90 from moving forward from the regular position. Therefore, the rear end portion of the brush drive shaft 112 can be prevented from falling out of the output portion 144 of the motor unit 140 during the automatic cleaning of the filter 40.

Further, similarly to the dust collecting portion 91 of the dust box 90, the stopper 130 is made of a transparent resin. Therefore, the user can recognize the amount of dust collected in the dust collecting portion 91 even through the stopper 130.

Further, the stopper 130 has a width in the right-and-left direction, which is larger than a width of the dust box 90 in the right-and-left direction. Therefore, a part of the front surface of the cartridge 50 that is provided adjacent to the dust box 90 is covered with the stopper 130. Therefore, by fixing the stopper 130 to the casing 1, the cartridge 50 can be fixed at the regular position. Further, the rear end portion of the filter drive shaft 67 can be prevented from falling out of the output portion 142 of the motor unit 140 during the automatic cleaning of the filter 40.

Further, with the configuration of the stopper 130 as described above, when the upper end portion of the stopper 130 is fixed to the casing 1, specifically, when the stopper 130 is closed, the upper end portion is moved rearward from a front side. Therefore, when the stopper 130 is closed, the dust box 90 and the cartridge 50 are pushed rearward by the stopper 130 from the front side. Thus, even when the dust box 90 and the cartridge 50 are not inserted to the regular positions, the dust box 90 and the cartridge 50 can be pushed by closing the stopper 130. As a result, the dust box 90 and the cartridge 50 can be arranged at the regular positions.

Further, an opening port 133 configured to restrict an operation of the fixing lever 120 (in other words, the fixing-lever hook portion 122) of the dust box 90 is formed in the stopper 130. The opening port 133 is formed at a position at which the front end portion of the fixing lever 120 is inserted in a state in which the fixing-lever hook portion 122 of the fixing lever 120 of the dust box 90 is engaged with the dust-box engaging portion 125 of the casing 1, specifically, in a state in which the dust box 90 is arranged at the regular position. Even when the distal end portion of the fixing lever 120 is pushed down so as to cancel the engagement state between the fixing-lever hook portion 122 and the dust-box engagement portion 125 in a state in which the front end portion of the fixing lever 120 is inserted into the opening port 133, the fixing lever 120 interferes with a lower edge portion of the opening port 133 to prevent the fixing lever 120 from being pushed down. Therefore, the dust box 90 can be prevented from being erroneously dismounted in a state in which the stopper 130 is closed.

Further, the stopper 130 includes bearing portions 134, each being configured to retain a front end portion of the filter drive shaft 67 (coupling portion 71 of the filter movement gear body 68) so as to be freely rotatable, and a bearing portion 135 configured to retain the front end portion of the brush drive shaft 112 so as to be freely rotatable. When the stopper 130 is closed, the front end portion of the filter drive shaft 67 is configured to be retained in each of the bearing portions 134 so as to be freely rotatable and the front end portion of the brush drive shaft 112 is configured to be retained in the bearing portion 135 so as to be freely rotatable. With the configuration described above, runout of the front end portion of the filter drive shaft 67 can be suppressed when the filter drive shaft 67 is rotated. Further, runout of the front end portion of the brush drive shaft 112 can be suppressed when the brush drive shaft 112 is swung or rotated. Specifically, when the filter drive shaft 67 and the brush drive shaft 112 are driven, an interval between the filter drive shaft 67 and the brush drive shaft 112 can be kept constant. As a result, a distance between the brush 111 and the filter 40 can be kept constant, thereby improving removal performance for the dust.

The bearing portion 134 corresponds to a first bearing portion of the present invention, whereas the bearing portion 135 corresponds to a second bearing portion of the present invention.

In Embodiment 1, the upper end portion of the stopper 130 is fixed indirectly to the casing 1. More specifically, a stopper hook portion 132 is provided to the upper end portion of the stopper 130. Further, a stopper engaging portion 102 that is an opening port to be engaged with the stopper hook portion 132 is formed in the upper surface 101 of the dust box 90. The upper end portion of the stopper 130 is fixed indirectly to the casing 1 by engaging the stopper hook portion 132 with the stopper engaging portion 102 in a state in which the dust box 90 is fixed at the regular position.

When the casing 1 includes a top plate provided above the dust box 90 and the cartridge 50, the stopper engaging portion 102 may be formed in the top plate so that the upper end portion of the stopper 130 is fixed directly to the casing 1. Further, when the top plate is provided, the upper end portion of the casing 1 may be mounted to the top plate so as to be freely rotatable. In this case, the stopper engaging portion 102 is formed at a position on the front surface 4 of the casing 1, which is below the dust box 90, and the stopper hook portion 132 is formed on a lower end portion of the stopper 130 so that the lower end portion of the casing 1 is fixed to the casing 1.

[Description of Operation]

Next, a cleaning operation for the filter 40 and a mount and dismount operation (mounting and dismounting operation) for the filter 40, the cartridge 50, and the dust box 90 are described.

[Cleaning Operation]

During the cleaning of the filter 40, the controller 150 controls the motor 141 of the motor unit 140 to rotate. Specifically, the controller 150 controls the filter drive shaft 67 to rotate in each of the cartridges 50. As a result, the filter 40 arranged in the upper traveling path 50a of the cartridge 50 moves toward the opening port 60, specifically, toward the dust box 90, as illustrated in FIG. 16. Further, the filter 40 is guided by the guiding portion 99 of the dust box 90 to be bent in an arc-like shape at the part of the opening port 60. Then, the filter 40 is securely inserted into the lower traveling path 50b.

On the other hand, when the controller 150 controls the motor 141 to rotate, the brush 111 and the brush drive shaft 112 of the cleaning mechanism 110 are, for example, swung. As a result, as illustrated in FIG. 16, the brush 111 projecting from the opening port 100 of the dust box 90 removes the dust from the part of the filter 40, which is exposed from the opening port 60 of the cartridge 50. Further, the dust that is removed from the filter 40 to adhere to the brush 11 is scraped off by the scraper 114 to be collected in the dust collecting portion 91 of the dust box 90. The reference symbol "160" in FIG. 16 denotes the dust.

The filter 40 cleaned by the cleaning mechanism 110 passes through the opening port 60 corresponding to a cleaning position to be placed in a state of being arranged in the lower traveling path 50*b*. In this state, the controller 150 controls the motor 141 to rotate in a reverse direction. As a result, the filter 40 arranged in the lower traveling path 50*b* moves toward the opening port 60 to be guided by the guiding portion of the dust box 90 to be bent in the arc-like shape and then returns to the upper traveling path 50*a*. The filter 40 may be cleaned by the cleaning mechanism 110 during the moving operation of the filter 40. The dust can be more securely removed from the filter 40.

In Embodiment 1, the cartridges 50 are arranged above the axial-flow fans 20 so as to respectively correspond to the axial-flow fans 20. By covering the air inlet 2 with the plurality of cartridges 50, a travel distance of the filter 40 can be reduced during the cleaning of the filter 40 in the cartridge 50. As a result, cleaning time for the filter 40 can be shortened.

In this case, when the filter 40 is cleaned as in Embodiment 1, an end portion of the upper traveling path 50*a* and an end portion of the lower traveling path 50*b*, which are located on the side opposite to the opening port 60, may be connected to each other to form an annular filter traveling path inside the cartridge 50 so as to accommodate an annular filter inside the cartridge 50. With the configuration described above, however, the indoor air sucked into the casing 1 is placed in a state as if the indoor air passed through two filters. As a result, a ventilation resistance inside the cartridge 50 increases. Therefore, in Embodiment 1, the filter 40 formed into the plate-like shape is configured to be accommodated in the cartridge.

(Mount and Dismount Operation for Filter 40, Cartridge 50, and Dust Box 90)

When the filter 40 is cleaned manually, the cartage 50 is dismounted from the casing 1. Further, when the dust collected in the dust collecting portion 91 of the dust box 90 is disposed of, the dust box 90 is dismounted from the casing 1.

In the indoor unit 200 according to Embodiment 1, when the cartridge 50 is dismounted from the casing 1, the design panel 11 provided on the front surface side of the casing 1 is opened and the stopper 130 is also opened. As a result, the cartridge 50 can be moved forward. Thus, by pulling out the cartridge 50 forward, the cartridge 50 can be dismounted from the casing 1 (see FIG. 4).

When the filter 40 is dismounted from the cartridge 50, the filter holding member 58 of the cartridge 50 is first opened. As a result, the meshing engagement between the tooth portions 46 of the filter 40 and the gear 69 of the filter moving gear body 68 is canceled to achieve a state in which the filter 40 is dismountable. In this state, the filter 40 is pulled out through the opening port 60 of the cartridge 50. As a result, the filter 40 can be dismounted from the cartridge 50.

When the filter 40 is mounted into the cartridge 50, the filter 40 is inserted into the upper traveling path 50*a* of the cartridge 50 from the opening port 60 in a state in which the filter holding member 58 is open. Thereafter, the filter holding member 58 is closed, thereby meshing the tooth portions 46 of the filter 40 and the gear 69 of the filter moving gear body 68 with each other.

In this case, the indoor unit for an air-conditioning apparatus, in which the air inlet is formed in the upper surface of the casing, is generally mounted onto a wall surface of an air-conditioned space such as a room. When the indoor unit is mounted onto the wall surface of the air-conditioned space as described above, the indoor unit is arranged at a high position. Therefore, in the related-art indoor unit for an air-conditioning apparatus, which has the automatic cleaning function for the filter and the air inlet formed in the upper surface of the casing, there is a problem in that it becomes difficult to precisely mount the filter to a moving unit when the filter is mounted into the casing again, resulting in malfunction of the filter. For example, when the filter is mounted in a state in which the gear of the moving unit meshes only with the tooth portions of one of the side edge portions of the filter, only the one side edge portion of the filter moves. As a result, the filter is caught in the traveling path of the filter.

In the indoor unit 200 according to Embodiment 1, however, the cartridge 50 is dismounted from the casing 1 so that the tooth portions 46 of the filter 40 and the gear 69 of the filter moving gear body 68 can mesh with each other at an easily workable location. Therefore, in the indoor unit 200 according to Embodiment 1, the filter 40 can be precisely mounted to the gear 69 of the filter moving gear body 68 with ease.

In particular, the indoor unit 200 according to Embodiment 1 is configured to move the filter 40 in the right-and-left direction when the filter 40 is automatically cleaned. Therefore, the configuration of Embodiment 1 in which the filter 40 is accommodated in the cartridge 50 so that the cartridge 50 is freely mountable into and dismountable from the casing 1 is particularly useful. More specifically, when the filter is moved in the right-and-left direction in the related-art indoor unit, at least two gears, which are the moving unit provided to the casing, are arranged on the front side and the rear side and a direction in which tooth grooves of the gears are formed is the fore-and-aft direction. In general, the filter is configured to be mounted and dismounted from the front side of the casing. Therefore, when the filter is mounted from the front side of the casing, the tooth portions of the filter must be inserted to the tooth grooves of both of the two gears provided on the front side and the rear side. The work described above is extremely difficult.

On the other hand, even when the dust box 90 is dismounted from the casing 1, the design panel 11 provided on the front surface side of the casing 1 is first opened. Then, the stopper 130 is also opened. By opening the stopper 130, the operation of the fixing lever 120 of the dust box 90 is enabled. By pulling out the dust box 90 forward in a state in which the front end portion of the fixing lever 120 is pushed down to cancel the engagement between the fixing-lever hook portion 122 and the dust-box engaging portion 125, the dust box 90 can be dismounted from the casing 1 (see FIG. 4). Thereafter, the lid portion 93 of the dust box 90 is opened so that the dust collected in the dust collecting portion 91 of the dust box 90 is disposed of.

The cartridge 50 and the dust box 90 can be mounted and dismounted independently of each other. Specifically, the cartridge 50 alone can be dismounted from the casing 1, and the dust box 90 alone can be dismounted from the casing 1. Therefore, for the indoor unit 200 according to Embodiment 1, ease of maintenance can be improved.

The cartridge 50 and the dust box 90 are pushed into the casing 1 from the front side so as to be mounted into the casing 1. As described above, the cartridge 50 and the dust box 90 can be mounted and dismounted independently of each other. Therefore, in the indoor unit 200 according to Embodiment 1, the cartridge 50 may be mounted into the casing 1 in a state in which the dust box 90 is mounted into the casing 1, and the cartridge 50 may be mounted into the casing 1 in a state in which the dust box 90 is not mounted into the casing 1.

Figure 30:
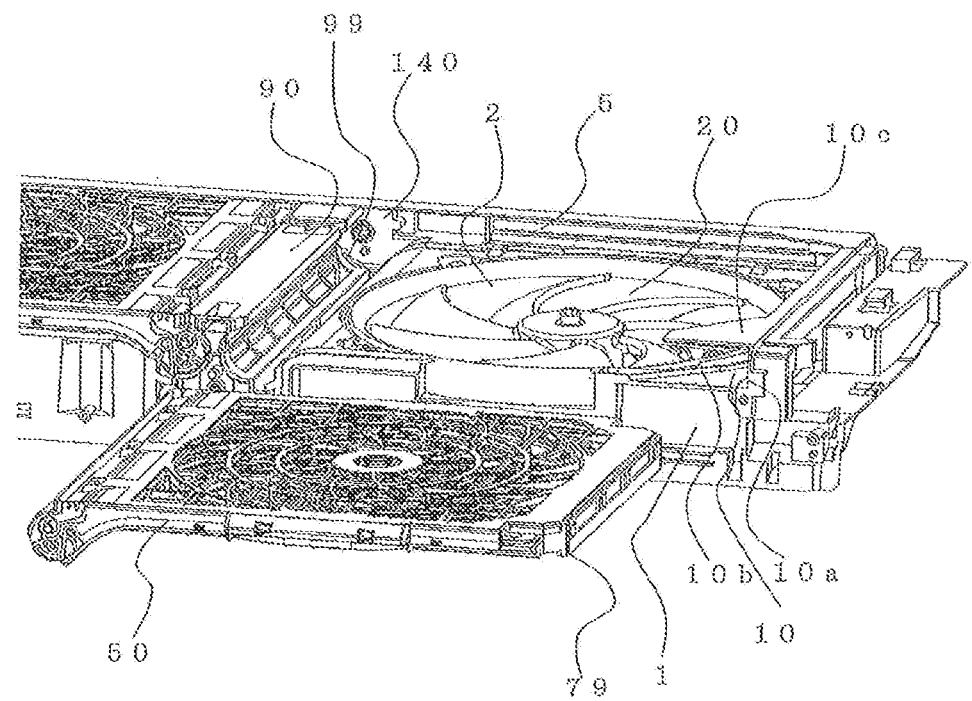
FIG. 30 is a perspective view for illustrating a method of mounting the cartridge into the casing in a state in which the dust box is mounted into the casing in the indoor unit for an air-conditioning apparatus according to the present invention.

FIG. 30 is a perspective view for illustrating a method of mounting the cartridge into the casing in a state in which the dust box is mounted into the casing in the indoor unit for an air-conditioning apparatus according to the present invention. FIG. 30 is an illustration of mounting of the cartridge 50 arranged on a right side surface 7 side of the casing 1 (see FIG. 1). A method of mounting the cartridge 50 arranged on a left side surface 8 side of the casing 1 (see FIG. 1) is the same.

In a state in which the dust box 90 is mounted into the casing 1, when the cartridge 50 is pushed into the casing 1 from the front side, the left side end portion (arc-shaped portion 59) of the cartridge 50 is guided by the guiding portion 99 of the dust box 90. Further, the right side end portion of the cartridge 50 is guided by a side wall portion 10a that is formed on the casing 1 in the fore-and-aft direction. As a result, when the cartridge 50 is pushed into the casing 1 from the front side, the cartridge 50 is guided to the regular mounting position. Then, the rear end portion of the filter drive shaft 67 (coupling portion 71 of the filter moving gear body 68) provided to the cartridge 50 and the output portion 142 of the motor unit 140 are coupled to each other. By providing the guiding function for the cartridge 50 to the dust box 90 as in Embodiment 1, a guiding member configured to guide the end portion of the cartridge 50, which is located on the dust box 90 side, is not required to be additionally provided. Therefore, the number of components can be reduced.

The cartridge 50 arranged at the regular mounting position is restrained from moving upward by a holding plate 10c provided so as to project from the side wall portion 10a toward the cartridge 50 and an upper portion of the guiding portion 99 of the dust box 90.

Figure 31:
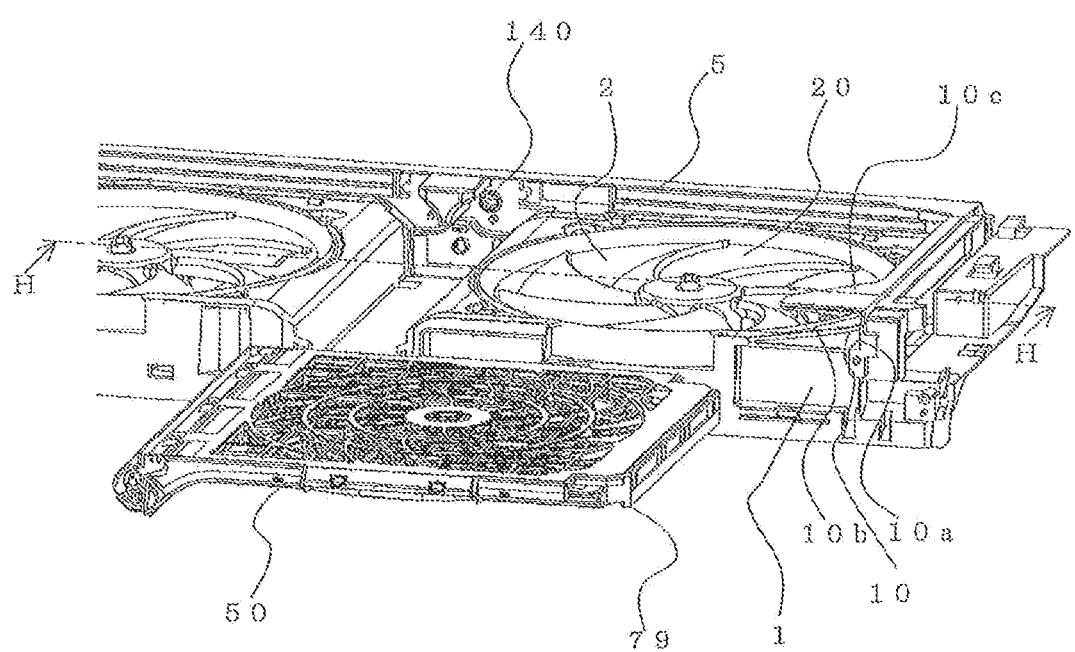
FIG. 31 is a perspective view for illustrating a method of mounting the cartridge into the casing in a state in which the dust box is not mounted into the casing in the indoor unit for an air-conditioning apparatus according to the present invention.
Figure 32:
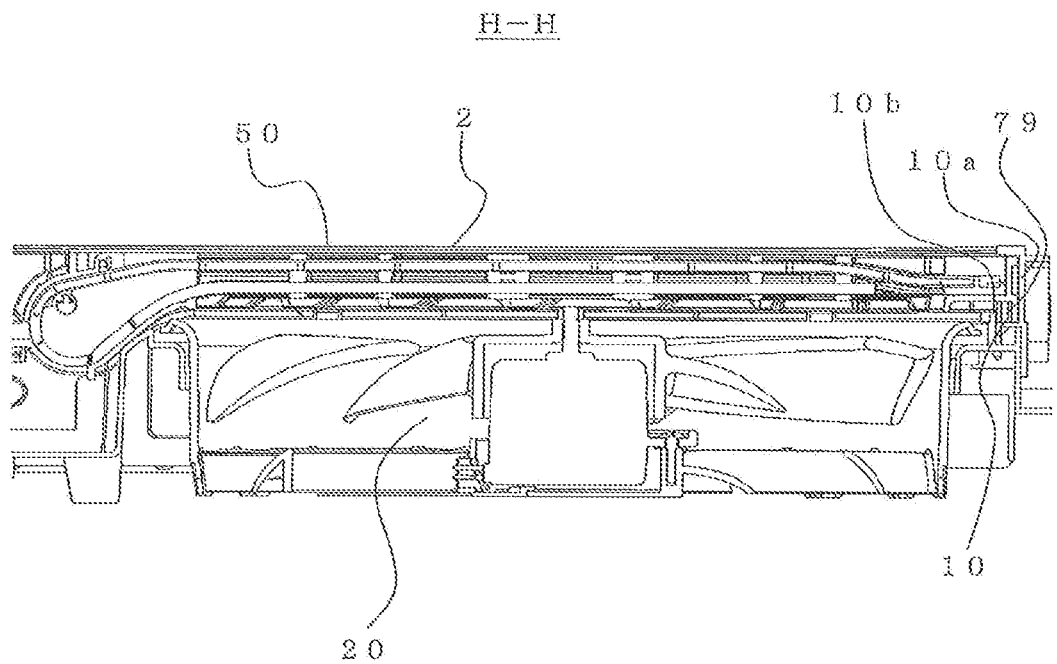
FIG. 32 is a sectional view of FIG. 31, taken along the line H-H.

FIG. 31 is a perspective view for illustrating a method of mounting the cartridge into the casing in a state in which the dust box is not mounted into the casing in the indoor unit for an air-conditioning apparatus according to the present invention. FIG. 32 is a sectional view of FIG. 31, taken along the line H-H. FIG. 31 and FIG. 32 are illustrations of mounting of the cartridge 50 arranged on the right side surface 7 side of the casing 1 (see FIG. 1). A method of mounting the cartridge 50 arranged on the left side surface 8 side of the casing 1 (see FIG. 1) is the same.

In a state in which the dust box 90 is not mounted into the casing 1, the left side end portion (arc-shaped portion 59) of the cartridge 50 cannot be guided by the guiding portion 99 of the dust box 90. Therefore, in the indoor unit 200 according to Embodiment 1, a guide groove 10 is formed on the casing 1. The guide groove 10 is formed, for example, between the side wall portion 10a and a convex portion 10b formed on the placement portion 15. Further, the guide groove 10 is formed so that a width in the right-and-left direction increases from the rear side toward the front side.

Further, a convex portion 79 is formed on the cartridge 50 so as to be located at a position opposed to the guide groove 10.

In a case where the dust box 90 is not mounted into the casing 1, when the cartridge 50 is pushed into the casing 1 from the front side, the convex portion 79 of the cartridge 50 is inserted into the guide groove 10. In this case, a front side portion of the guide groove 10 has a large width in the right-and-left direction. Therefore, the convex portion 79 of the cartridge 50 can be easily inserted into the guide groove 10. When the cartridge 50 is further pushed rearward in this state, the convex portion 79 of the cartridge 50 is guided by the side wall (side wall portion 10a or convex portion 10b) of the guide groove 10. As illustrated in FIG. 32, a rear portion of the guide groove 10 is formed so that a width thereof in the right-and-left direction is slightly larger than a width of the convex portion 79 of the cartridge 50 in the right-and-left direction. Therefore, the cartridge 50 is guided to the regular mounting position. Then, the rear end portion of the filter drive shaft 67 (coupling portion 71 of the filter moving gear body 68) provided to the cartridge 50 and the output portion 142 of the motor unit 140 are coupled to each other. As described above, in the indoor unit 200 according to Embodiment 1, even in the case where the dust box 90 is not mounted into the casing 1, the cartridge 50 can be easily mounted into the casing 1.

Embodiment 2

In Embodiment 2, a variation of the indoor unit 200 described in Embodiment 1 is described. In Embodiment 2, items that are not particularly described are the same as those of Embodiment 1, and the same functions and configurations are denoted with the same reference symbols in description.

Figure 33:
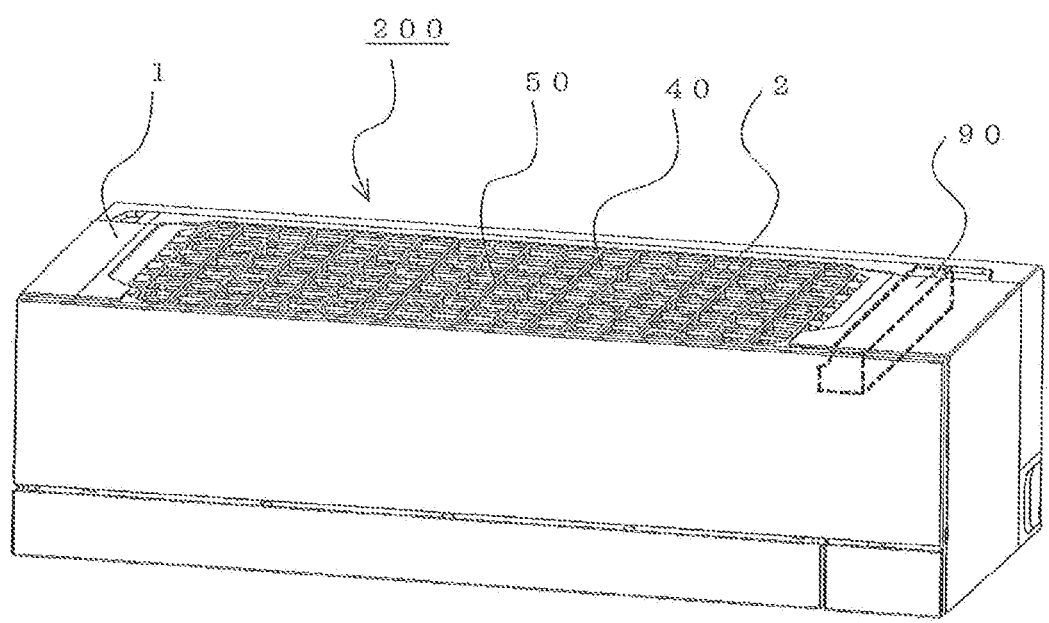
FIG. 33 is a perspective view for illustrating an example of an indoor unit for an air-conditioning apparatus according to Embodiment 2 of the present invention.

FIG. 33 is a perspective view for illustrating an example of an indoor unit for an air-conditioning apparatus according to Embodiment 2 of the present invention.

In Embodiment 1, the plurality of cartridges 50 are provided to the air inlet 2 of the casing 1. On the other hand, the indoor unit 200 illustrated in FIG. 33 includes a single cartridge 50 provided to the air inlet 2 of the casing 1. Specifically, the indoor unit 200 illustrated in FIG. 33 has a configuration of covering the air inlet 2 with a single filter 40. Further, in the indoor unit 200 illustrated in FIG. 33, the opening port 60 is formed on the right side end portion of the cartridge 50. The dust box 90 is provided so as to be opposed to the right side end portion of the cartridge 50.

When the indoor unit 200 is configured as illustrated in FIG. 33, the effects of effectively utilizing the dead space between the adjacent axial-flow fans 20 cannot be obtained. However, the other effects described in Embodiment 1 can be obtained.

Figure 34:
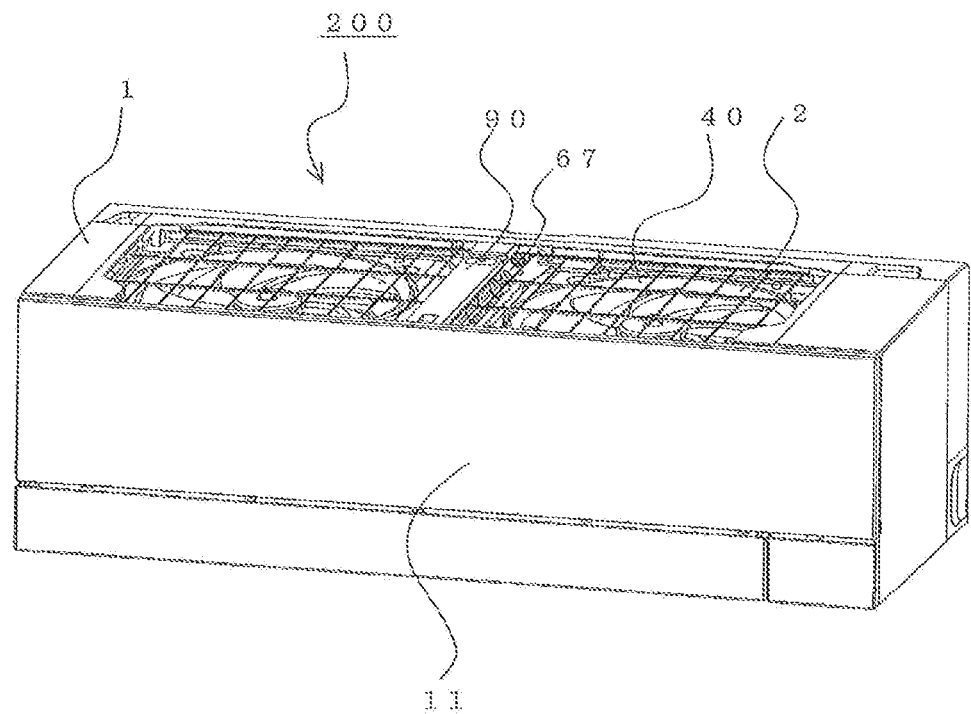
FIG. 34 is a perspective view for illustrating another example of the indoor unit for an air-conditioning apparatus according to Embodiment 2 of the present invention.
Figure 35:
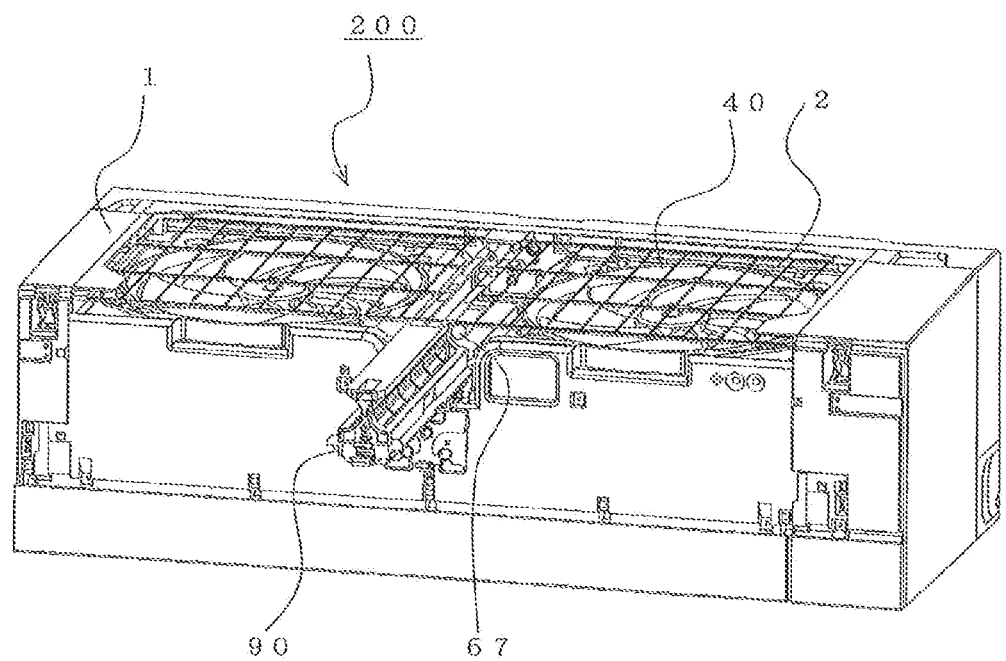
FIG. 35 is a perspective view for illustrating the indoor unit illustrated in FIG. 34 in a state in which the decorative panel is dismounted.

FIG. 34 is a perspective view for illustrating another example of the indoor unit for an air-conditioning apparatus according to Embodiment 2 of the present invention. FIG. 35 is a perspective view for illustrating the indoor unit in a state in which the decorative panel is dismounted.

For example, there is supposed a case where a maintenance engineer manually cleans the filter 40 and the user only automatically cleans the filter 40. In such a case, the cartridge 50 is not particularly required to be used. Specifically, the filter drive shaft 67 may be directly provided to the casing 1.

When the indoor unit 200 is configured as illustrated in FIG. 34 and FIG. 35, the effects of enabling the meshing engagement between the tooth portions 46 of the filter 40 and the gear 69 of the filter moving gear body 68 at the easily workable location cannot be obtained. However, the other effects described in Embodiment 1 can be obtained.

Figure 36:
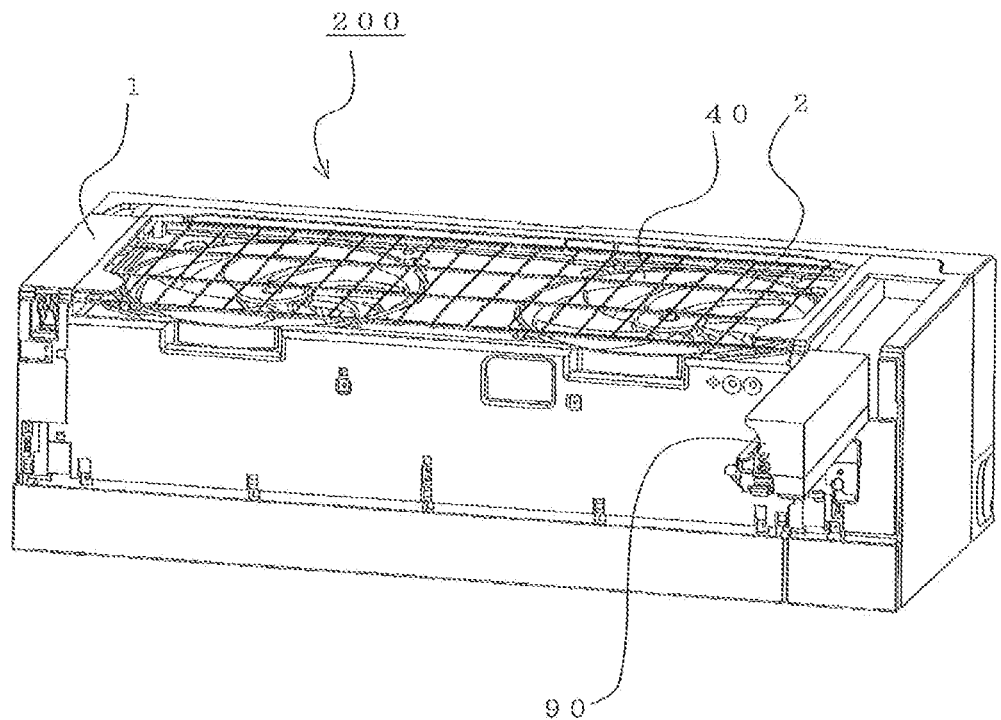
FIG. 36 is a perspective view for illustrating a further example of the indoor unit for an air-conditioning apparatus according to Embodiment 2 of the present invention in a state in which the decorative panel is dismounted.

FIG. 36 is a perspective view for illustrating a further example of the indoor unit for an air-conditioning apparatus according to Embodiment 2 of the present invention in a state in which the decorative panel is dismounted.

Even when the indoor unit 200 is configured so as not to use the cartridge 50, the air inlet 2 can be covered with the single filter 40 and the dust box 90 can be arranged on one side of the filter 40 in the right-and-left direction as in the case of the indoor unit 200 illustrated in FIG. 33.

When the indoor unit 200 is configured as illustrated in FIG. 36, the same effects as those of the indoor unit 200 illustrated in FIG. 34 and FIG. 35 can be obtained, except for the effect of effectively utilizing the dead space between the adjacent axial-flow fans 20.

Figure 37:
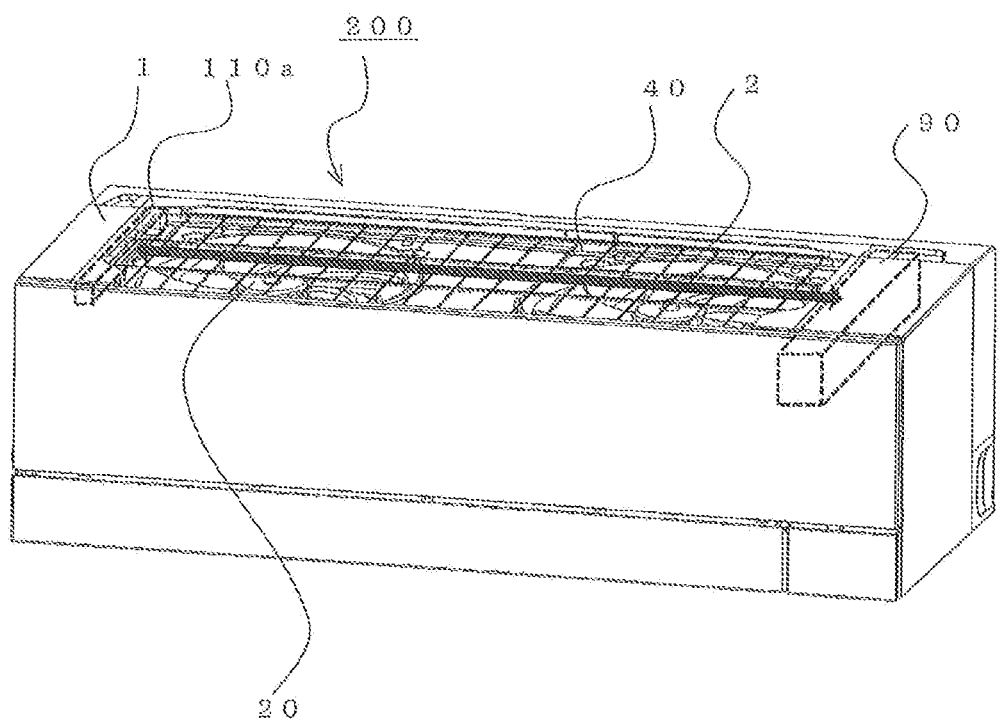
FIG. 37 is a perspective view for illustrating a further example of the indoor unit for an air-conditioning apparatus according to Embodiment 2 of the present invention.

FIG. 37 is a perspective view for illustrating a further example of the indoor unit for an air-conditioning apparatus according to Embodiment 2 of the present invention.

The filter 40 can be automatically cleaned through relative movement between the filter 40 and the cleaning mechanism. Therefore, when the indoor unit 200 is configured without using the cartridge 50 as illustrated in FIG. 34 to FIG. 36, a cleaning mechanism 110*a* illustrated in FIG. 37 can be used in place of the cleaning mechanism 110 described in Embodiment 1. More specifically, the indoor unit 200 illustrated in FIG. 37 includes the dust box 90 arranged on one side of the filter 40 in the right-and-left direction. The cleaning mechanism 110*a* of the indoor unit 200 is provided above the fans (the axial-flow fans 20 are exemplarily illustrated in FIG. 37), and includes a brush freely movable in the right-and-left direction and other components. The cleaning mechanism 110*a* moves in the indoor unit 200 illustrated in FIG. 37. Therefore, the filters 40 are not required to be moved. Thus, the indoor unit 200 illustrated in FIG. 37 does not include the filter drive shaft 67.

Even when the indoor unit 200 is configured as illustrated in FIG. 37, the dust box 90 and the cleaning mechanism 110*a* can be arranged above the heat exchanger 30. Therefore, the dimension of the indoor unit 200 in the fore-and-aft direction can be prevented from being increased and the shape and the size of the heat exchanger 30 can also be prevented from being limited while the automatic cleaning function for the filter 40 is provided.

Figure 38:
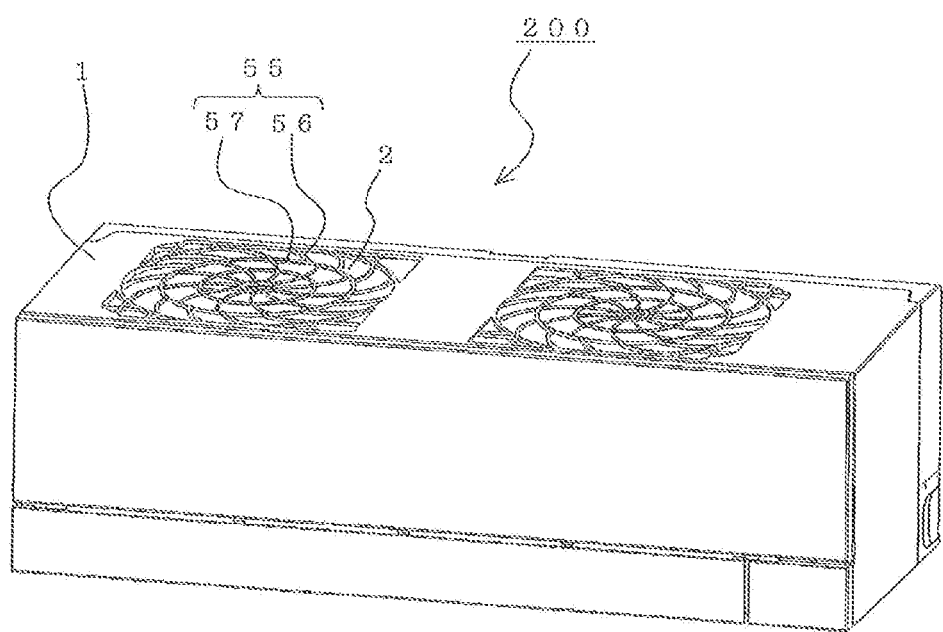
FIG. 38 is a perspective view for illustrating a further example of the indoor unit for an air-conditioning apparatus according to Embodiment 2 of the present invention.

FIG. 38 is a perspective view for illustrating a further example of the indoor unit for an air-conditioning apparatus according to Embodiment 2 of the present invention.

In Embodiment 1, the strength in the vicinity of the air inlet 2 (specifically, the strength of the casing 1) is ensured by the cartridge 50 whose strength is ensured by the bars 55. When the indoor unit 200 is configured without using the cartridge 50, however, the bars 55 provided to the cartridge 50 in Embodiment 1 may be provided directly to the air inlet 2 of the casing 1 so as to ensure the strength in the vicinity of the air inlet 2 (specifically, the strength of the casing 1).

When the axial-flow fan 20 is adopted as the fan of the indoor unit 200 in this case, the bars 55 including the first bars 56 or the bars 55 including the first bars 56 and the second bars 57 only need to be provided directly to the air inlet 2 (at a position opposed to the axial-flow fan 20), as illustrated in FIG. 38. The range of interference between the leading edge portions 22*a* of the blades 22 and the slipstream behind the first bars 56 can be reduced. Therefore, the noise generated in the axial-flow fan 20 can be suppressed.

The case where the indoor unit 200 is configured without using the cartridge 50 corresponds to, for example, the case illustrated in FIG. 34 to FIG. 37, and a case where the indoor unit 200 is configured so as not to have the automatic cleaning function for the filter 40.

In this case, the bars 55 only need to be provided on at least one of an upstream side and a downstream side of the filter 40. When the bars 55 are provided on the downstream side of the filter 40, specifically, between the filter 40 and the axial-flow fan 20, the flange portion 78 formed into the circular shape with the diameter equal to or larger than that of the upper opening port of the bellmouth 24 (flange portion 78 illustrated in FIG. 21) may be provided on the outer peripheral side of the bars 55 so as to project toward the bellmouth 24. The same effects as those obtained when the bellmouth 24 is extended in the vertical direction (direction of the rotary shaft of the axial-flow fan 20) are obtained, and therefore the noise generated in the axial-flow fan 20 can be further suppressed. In this case, it is preferred not to form the opening port on the outer peripheral side of the flange portion 78. The air flows smoothly into the bellmouth 24, and therefore the noise generated in the axial-flow fan 20 can be further suppressed.

Figure 39:
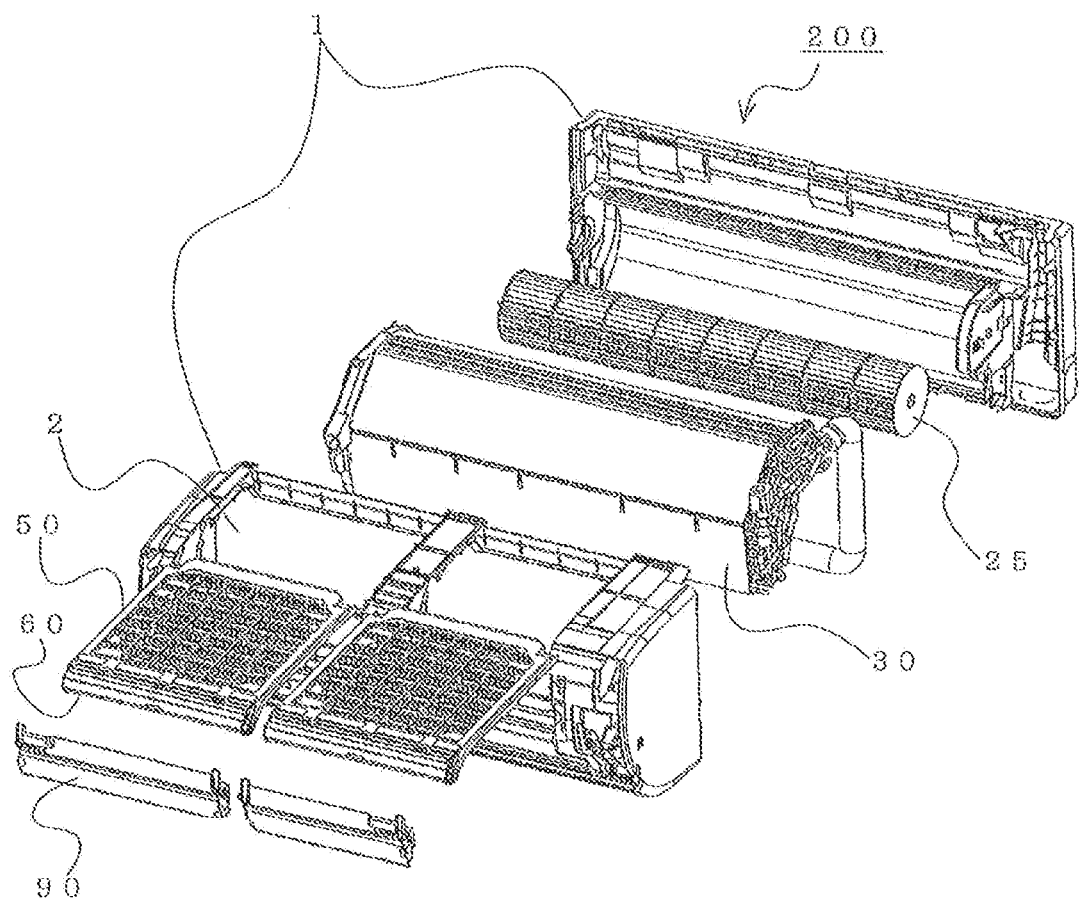
FIG. 39 is an exploded perspective view for illustrating a further example of the indoor unit for an air-conditioning apparatus according to Embodiment 2 of the present invention.

FIG. 39 is an exploded perspective view for illustrating a further example of the indoor unit for an air-conditioning apparatus according to Embodiment 2 of the present invention.

The cartridge 50 of the indoor unit 200 illustrated in FIG. 39 is configured to accommodate the filter 40 so as to be freely movable in the fore-and-aft direction. In other words, the indoor unit 200 illustrated in FIG. 39 is configured to enable the mounting of the cartridge 50 described in Embodiment 1 after rotating the cartridge 50 by 90 degrees in plan view. Therefore, the indoor unit 200 illustrated in FIG. 39 has the opening port 60 formed in one end portion of the cartridge 50 in the fore-and-aft direction. The dust box 90 is provided so as to be opposed to the end portion. In FIG. 39, an example where the dust box 90 is arranged so as to be opposed to the front side end portion of the cartridge 50 is illustrated.

Even when the indoor unit 200 is configured as illustrated in FIG. 39, the cartridge 50 is dismounted from the casing 1 so that the tooth portions 46 of the filter 40 and the gear 69 of the filter moving gear body 68 can mesh with each other at the easily workable location. Therefore, in the indoor unit 200 according to Embodiment 1, the filter 40 can be precisely mounted to the gear 69 of the filter moving gear body 68 with ease.

Although an example where a crossflow fan 25 is adopted for the indoor unit 200 is illustrated in FIG. 39, it is apparent that the axial-flow fan 20 may also be adopted.

REFERENCE SIGNS LIST

1 casing 2 air inlet 3 air outlet 4 front surface 5 rear surface 6 upper surface 7 right side surface 8 left side surface 9 lower surface guide groove 10*a* side wall portion 10*b* convex portion 10*c* holding plate 11 design panel 12 vertical airflow-direction flap 14 drain pan 15 placement portion 20 axial-flow fan 21 boss portion 22 blade 22*a* leading edge portion 23 fan drive motor 24 bellmouth 25 crossflow fan 30 heat exchanger 31 fin 32 heat-transfer tube 40 filter 41 outer frame 42 trapping portion 43 side edge portion 44 side edge portion 46 tooth portion 47 grid 48 stopper portion 50 cartridge 50*a* upper traveling path 50*b* lower traveling path 51 first frame 52 second frame 53 third frame 54 ventilation port 55 bar 56 first bar 57 second bar 58 filter holding member 59 arc-shaped portion 60 opening port 61 side surface 62 through hole 63 shaft retaining portion 64 cutaway 65 boss retaining portion 66 cutaway 67 filter drive shaft 68 filter moving gear body 69 gear 70 boss portion 71 coupling portion 72 convex portion 73 shaft portion 74 filter detection switch opening port 76 filter detection lever 77 rotary shaft 78 flange portion 79 convex portion 80 handle 90 dust box 91 dust collecting portion 92 main body portion 93 lid portion 94 rotary shaft 95 insertion hole 96 cutaway 97 support member 98 cutaway 99 guiding portion 100 opening port 101 upper surface 102 stopper engaging portion 110 cleaning mechanism 110a cleaning mechanism 111 brush 112 brush drive shaft 113 concave portion 114 scraper 115 convexo-concave portion 120 fixing lever 121 rotary shaft 122 fixing-lever hook portion 123 spring 124 fixing-lever lid 125 dust-box engaging portion 130 stopper 131 rotary shaft 132 stopper hook portion 133 opening port 134 bearing portion 135 bearing portion 140 motor unit 141 motor 142 output portion 143 concave portion 144 output portion 145 convex portion 150 controller 151 infrared sensor 160 dust 200 indoor unit

The invention claimed is:

1. An indoor unit for an air-conditioning apparatus, comprising:
    a casing having an air inlet formed in an upper surface of the casing and an air outlet formed below the air inlet;
    an axial-flow fan provided on downstream of the air inlet and including a plurality of blades;
    a heat exchanger provided at a position on downstream of the axial-flow fan and on upstream of the air outlet;
    a plurality of filters provided to the air inlet to remove dust from air sucked into the casing by the axial-flow fan; and
    a bar provided on at least one of upstream of the plurality of filters and downstream of the plurality of filters in the air inlet provided on upstream of the axial-flow fan,
    the bar including a plurality of first bars radially extending from a rotary shaft of the axial-flow fan in plan view;
    leading edge portions of the plurality of blades are inclined in a direction of rotation of the axial-flow fan from the rotary shaft side of the axial-flow fan to an outer peripheral side in plan view; and
    the plurality of first bars are inclined in a direction opposite to the direction of rotation of the axial-flow fan from the rotary shaft side of the axial-flow fan to the outer peripheral side in plan view, wherein
    the leading edge portions of the plurality of blades of the axial-flow fan are each formed into an arc-like shape, which is convex in the direction opposite to the direction of rotation of the axial-flow fan,
    the plurality of first bars are formed into an arc-like shape, which is convex in the direction of rotation of the axial-flow fan, and
    the bar includes a second bar having a circular shape with the rotary shaft of the axial-flow fan as a center in plan view.

2. The indoor unit for an air-conditioning apparatus of claim 1, wherein
    the plurality of first bars are formed on an inner peripheral side and an outer peripheral side of the second bar, and
    a number of the plurality of first bars provided on the outer peripheral side of the second bar is larger than a number of the plurality of first bars provided on the inner peripheral side of the second bar.

3. The indoor unit for an air-conditioning apparatus of claim 1, wherein
    the plurality of first bars are formed only on an outer peripheral side of the second bar.

4. The indoor unit for an air-conditioning apparatus of claim 1, wherein the bar partitions spaces so that the spaces each have same sizes.

5. The indoor unit for an air-conditioning apparatus of claim 1, wherein the number of the plurality of first bars and a number of the plurality of blades are relatively prime.

6. The indoor unit for an air-conditioning apparatus of claim 1, wherein
    the bar is provided on at least downstream of the plurality of filters,
    the axial-flow fan includes a bellmouth provided on an outer peripheral side thereof, and
    the bar has a flange portion formed on an outer peripheral side thereof, the flange portion being formed into a circular shape with a diameter equal to or larger than a diameter of an upper opening of the bellmouth so as to project toward the bellmouth.

7. The indoor unit for an air-conditioning apparatus of claim 6, wherein an opening is not formed on an outer peripheral side of the flange portion.

8. The indoor unit for an air-conditioning apparatus of claim 1, further comprising a cartridge provided to the air inlet of the casing, having a ventilation port formed in an upper surface of the cartridge and a ventilation port formed in a lower surface of the cartridge, and accommodating the plurality of filters,
    wherein the bar is provided to at least one of the ventilation port formed in the upper surface of the cartridge and the ventilation port formed in the lower surface of the cartridge.

* * * * *